US011623566B2

(12) United States Patent
Shirai

(10) Patent No.: US 11,623,566 B2
(45) Date of Patent: Apr. 11, 2023

(54) DRIVING SUPPORT SYSTEM, DRIVING SUPPORT METHOD, AND NON-TRANSITORY RECORDING MEDIUM

(71) Applicant: TOYOTA JIDOSHA KABUSHIKI KAISHA, Toyota (JP)

(72) Inventor: Ryo Shirai, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/483,377

(22) Filed: Sep. 23, 2021

(65) Prior Publication Data

US 2022/0134952 A1 May 5, 2022

(30) Foreign Application Priority Data

Oct. 30, 2020 (JP) .............................. JP2020-182639

(51) Int. Cl.
*B60R 1/00* (2022.01)
*B60Q 9/00* (2006.01)
*H04N 5/77* (2006.01)

(52) U.S. Cl.
CPC ................ *B60R 1/00* (2013.01); *B60Q 9/008* (2013.01); *H04N 5/77* (2013.01); *B60R 2300/105* (2013.01); *B60R 2300/806* (2013.01)

(58) Field of Classification Search
CPC ................ B60R 1/00; B60R 2300/105; B60R 2300/806; B60Q 9/008; H04N 5/77
USPC ........................................................ 348/148
See application file for complete search history.

(56) References Cited

U.S. PATENT DOCUMENTS

| 2006/0206243 A1* | 9/2006 | Pawlicki ................. G06T 7/174 |
| | | 382/104 |
| 2010/0194549 A1* | 8/2010 | Tonokawa ............... H04N 5/76 |
| | | 340/425.5 |
| 2018/0313658 A1* | 11/2018 | Matsui ...................... B60R 1/00 |
| 2020/0307582 A1* | 10/2020 | Sato ....................... B60W 10/04 |

FOREIGN PATENT DOCUMENTS

| JP | 2019-028482 A | 2/2019 |
| JP | 2019-032743 A | 2/2019 |

\* cited by examiner

*Primary Examiner* — Thai Q Tran
*Assistant Examiner* — Nienru Yang
(74) *Attorney, Agent, or Firm* — Sughrue Mion, PLLC

(57) ABSTRACT

The driving support system includes an imaging section installed to a vehicle capable of executing a driving support state, and the imaging section being capable of imaging a imaging subject positioned in surroundings of the vehicle, and a processor connected to the imaging section. The processor is configured to generate image data, determine whether or not a predetermined recording condition has been satisfied, cause the image data to be recorded in the memory in cases in which the recording condition has been determined to have been satisfied, determine whether or not the vehicle is in any of the driving support states, and change the recording condition to a specific recording condition that is the recording condition corresponding to the driving support state of the vehicle in cases in which the vehicle has been determined to be in any of the driving support states.

24 Claims, 21 Drawing Sheets

| DRIVING SUPPORT STATE | THRESHOLD VALUE |
|---|---|
| PARKING-EXIT SUPPORT STATE | FIRST THRESHOLD VALUE |
| SIDE MONITORING SUPPORT STATE | SECOND THRESHOLD VALUE |
| PARKING SUPPORT STATE | THIRD THRESHOLD VALUE |
| OFF-ROAD TRAVEL SUPPORT STATE | FOURTH THRESHOLD VALUE |

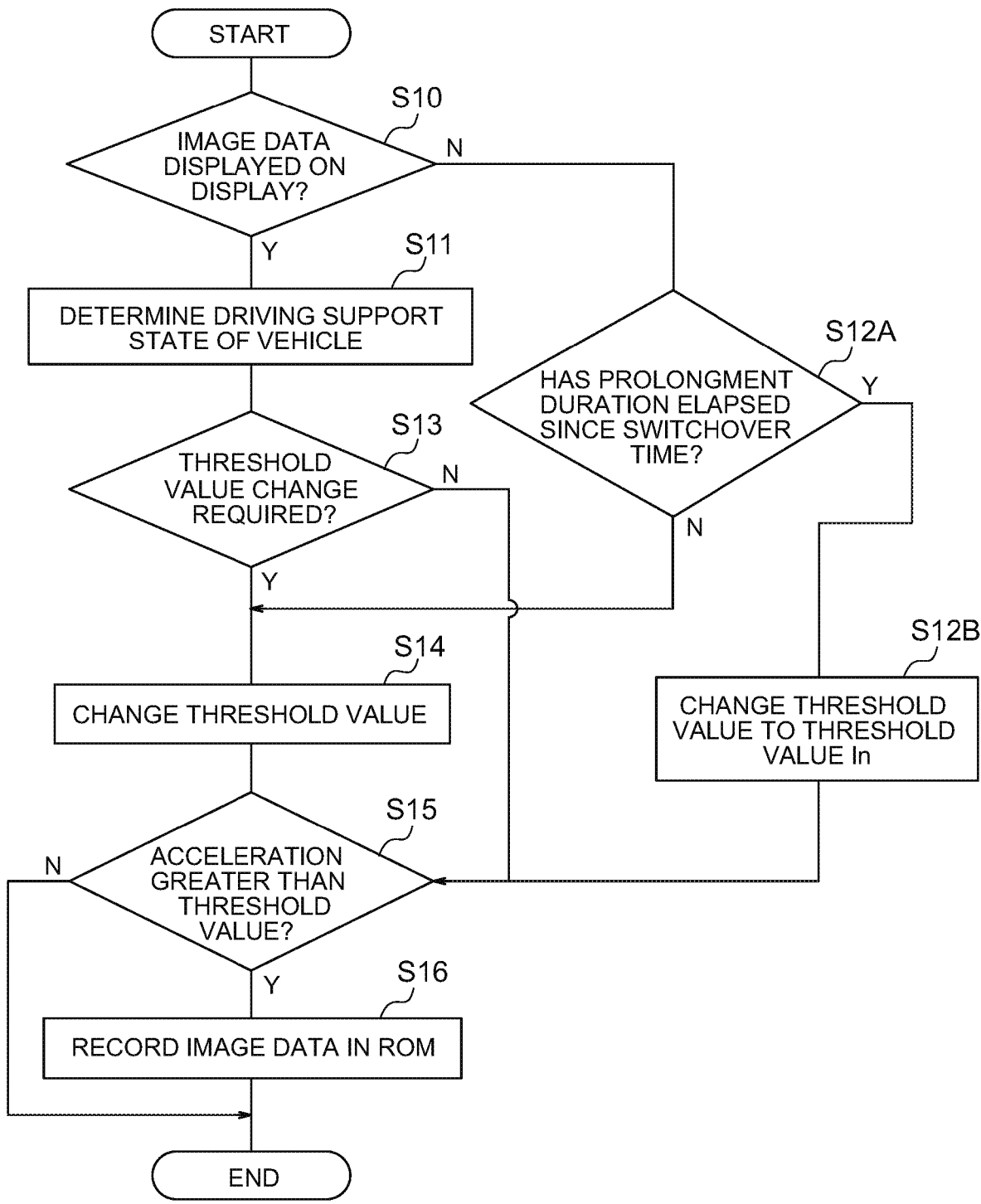

DRIVING SUPPORT SYSTEM, DRIVING SUPPORT METHOD, AND NON-TRANSITORY RECORDING MEDIUM

CROSS-REFERENCE TO RELATED APPLICATION

This application is based on and claims priority under 35 USC 119 from Japanese Patent Application No. 2020-182639 filed on Oct. 30, 2020, the disclosure of which is incorporated by reference herein.

BACKGROUND

Technical Field

The present disclosure relates to a driving support system, a driving support method, and a non-transitory recording medium.

Related Art

Japanese Patent Application Laid-Open (JP-A) No. 2019-028482 discloses a vehicle provided with a drive recorder. In this vehicle, when acceleration of the vehicle exceeds a predetermined threshold value, image data generated by the drive recorder (a camera) is recorded in a recording section.

Moreover, when the vehicle reverses, the threshold value is changed to a lower value than that employed when driving forward. Accordingly, image data generated by the drive recorder is recorded in the recording section even if for example the vehicle contacts an obstacle while reversing slowly into a parking space.

In JP-A No. 2019-028482, the threshold value employed when reversing the vehicle into a parking space is the same as a threshold value employed when reversing the vehicle out of a parking space. Accordingly, if the threshold value employed in such cases is set to a low value, image data generated by the drive recorder is recorded in the recording section even if for example the vehicle entering the parking space contacts wheel stoppers installed in the parking space. On the other hand, if the threshold value employed in such cases is set to a high value, image data generated by the drive recorder may not be recorded in the recording section even if for example the vehicle contacts another vehicle when leaving the parking space.

SUMMARY

In consideration of the above circumstances, an object of the present disclosure is to obtain a driving support system, a driving support method, and a non-transitory recording medium capable of reducing the chance of failing to record image data that needs to be recorded in a memory, while also reducing the chance of recording image data that does not need to be recorded in the memory.

A driving support system includes: a memory; an imaging section installed at a vehicle configured to selectively execute one driving support state among a plurality of driving support states configured to support a driving operation by a driver, the imaging section being configured to image an imaging subject positioned at a periphery of the vehicle; and a processor coupled to the memory and to the imaging section. The processor is configured to: generate image data by performing image processing on an electrical signal transmitted from the imaging section; determine whether or not a predetermined recording condition has been satisfied; cause the image data to be recorded in the memory in cases in which the recording condition has been determined to have been satisfied; determine whether or not the vehicle is in any of the driving support states; and change the recording condition to a specific recording condition that is a recording condition corresponding to the driving support state of the vehicle in cases in which the vehicle has been determined to be in any of the driving support states.

In the driving support system according to the first aspect of the present disclosure, the processor generates the image data by performing image processing on the electrical signal transmitted from the imaging section that is capable of imaging an imaging subject positioned in the surroundings of the vehicle. The processor causes the image data to be recorded in the memory in cases in which the condition-satisfaction determination section determines that the recording condition has been satisfied.

The processor changes the recording condition to the specific recording condition that is the recording condition corresponding to the driving support state of the vehicle in cases in which the processor determines that the vehicle is in any of the driving support states. The respective specific recording conditions can be set in consideration of predetermined events that may befall the vehicle when the vehicle is in the respective driving support states. According, in the driving support system according to the first aspect that determines whether or not the recording condition has been satisfied using the specific recording condition, even when the vehicle is in any of the driving support states, there is little chance of image data that does not need to be recorded in the memory being recorded in the memory, and there is also little chance of image data that needs to be recorded not being recorded in the memory.

A driving support system according to a second aspect of the present disclosure, includes, in the first aspect, a display section configured to display the image data. The processor is configured to determine whether or not the vehicle is in any of the driving support states based on at least a type of the image data displayed at the display section.

In the second aspect of the present disclosure, the display section is capable of displaying the image data, and so the driver can receive driving support by looking at the image data displayed on the display section. The processor determines whether or not the vehicle is in any of the driving support states based on at least the type of image data displayed on the display section. The processor is thereby capable of determining whether or not the vehicle is in any of the driving support states with a high level of precision.

A driving support system according to a third aspect of the present disclosure includes, in the first aspect, a sensor configured to measure a size of a physical quantity arising in the vehicle as a result of a collision with an obstacle. The processor determines the recording condition to have been satisfied in cases in which an output value of the sensor exceeds a predetermined threshold value relating to the size of the physical quantity. The processor changes the threshold value to a first threshold value in cases in which the driving support state is a parking-exit support state configured to support a driving operation to cause the vehicle to exit from a parking space. The processor changes the threshold value to a second threshold value larger than the first threshold value in cases in which the driving support state is a side monitoring support state configured to support monitoring at a side of the vehicle by the driver.

In the third aspect of the present disclosure, the processor determines the recording condition to have been satisfied in cases in which the output value of the sensor that measures the size of a physical quantity arising in the vehicle as a result of a collision with an obstacle exceeds the predetermined threshold value relating to the size of the physical quantity. This physical quantity may for example be at least one of acceleration or load.

The processor changes the threshold value to the first threshold value in cases in which the driving support state is the parking-exit support state to support a driving operation to cause the vehicle to exit from a parking space. The first threshold value can be set to a level that the output value of the sensor will not exceed when the wheels of the vehicle ride over small bumps or dips on the road surface. Accordingly, there is a low likelihood of the output value of the sensor exceeding the first threshold value if for example the wheels of the vehicle ride over small bumps or dips on the road surface in cases in which the driving support state is the parking-exit support state. Accordingly, there is little chance that image data generated by the processor at this time that does not need to be recorded is recorded in the memory.

On the other hand, the first threshold value can also be set to a level that the output value of the sensor will exceed if for example the vehicle collides with another vehicle while exiting from a parking space. There is therefore a high likelihood that the output value of the sensor will exceed the first threshold value if for example the vehicle collides with another vehicle while exiting from the parking space in cases in which the driving support state is the parking-exit support state. Accordingly, there is little chance of image data generated by the processor that needs to be recorded not being recorded in the memory while in this state.

Moreover, the processor changes the threshold value to the second threshold value that is larger than the first threshold value in cases in which the driving support state is the side monitoring support state to support monitoring at a side of the vehicle by the driver. The second threshold value can be set to a level that the output value of the sensor will exceed if a wheel of the vehicle contacts a roadside curb in an oblique direction. The second threshold value can also be set to a level that the output value of the sensor will exceed if the vehicle that is exiting a parking space positioned between two other stationary vehicles (namely, the vehicle that is passing out from between the two other vehicles) contacts either of the other vehicles. The second threshold value can also be set to a level that the output value of the sensor will exceed if the vehicle that is exiting from a parking space positioned between two other stationary vehicles while turning toward the left side or the right side contacts either of the other vehicles (namely, contacts either of the other vehicles on a turn). Accordingly, there is a high likelihood that the output value of the sensor will exceed the second threshold value if for example a wheel of the vehicle contacts a roadside curb in an oblique direction while executing parallel parking in cases in which the driving support state is the side monitoring support state. Accordingly, there is little chance of image data generated by the processor that needs to be recorded not being recorded in the memory while in this state.

A driving support system according to a fourth aspect of the present disclosure, in the third aspect, wherein the processor changes the threshold value to a third threshold value larger than the second threshold value in cases in which the driving support state is a parking support state configured to support a driving operation to cause the vehicle to park in a parking space.

In the fourth aspect of the present disclosure, the processor changes the threshold value to the third threshold value that is larger than the second threshold value in cases in which the driving support state is the parking support state to support a driving operation to park the vehicle in a parking space. The third threshold value can be set to a level that the output value of the sensor will not exceed if a wheel of the vehicle contacts a wheel stopper provided in the parking space. Accordingly, there is a low likelihood of the output value of the sensor exceeding the third threshold value if for example a wheel of the vehicle contacts the wheel stopper provided in the parking space in cases in which the driving support state is the parking support state. Accordingly, there is little chance of image data generated by the processor that does not need to be recorded being recorded in the memory while in this state.

On the other hand, the third threshold value can also be set to a level that the output value of the sensor will exceed if the vehicle body of the vehicle contacts an obstacle (for example a pole) in the parking space. Accordingly, there is a high likelihood that the output value of the sensor will exceed the third threshold value if for example the vehicle body of the vehicle contacts a pole in the parking space in cases in which the driving support state is the parking support state. Accordingly, there is little chance of image data generated by the processor that needs to be recorded not being recorded in the memory while in this state.

A driving support system according to a fifth aspect of the present disclosure, in the fourth aspect, wherein the processor changes the threshold value to a fourth threshold value larger than the third threshold value in cases in which the driving support state is an off-road travel support state configured to support a driving operation to cause the vehicle to travel along an off-road terrain.

In the fifth aspect of the present disclosure, the processor changes the threshold value to the fourth threshold value that is larger than the third threshold value in cases in which the driving support state is the off-road travel support state to support a driving operation to cause the vehicle to travel along an off-road terrain. The fourth threshold value can be set to a level that the output value of the sensor will not exceed if a wheel of the vehicle rides over a rock on the off-road terrain. There is therefore a low likelihood of the output value of the sensor exceeding the fourth threshold value if for example a wheel of the vehicle rides over a rock in cases in which the driving support state is the off-road travel support state. Accordingly, there is little chance of image data generated by the processor that does not need to be recorded being recorded in the memory while in this state.

On the other hand, the fourth threshold value can also be set to a level that the output value of the sensor will exceed if the vehicle traveling on the off-road terrain contacts another vehicle. Accordingly, there is a high likelihood that the output value of the sensor will exceed the fourth threshold value if for example the vehicle traveling on the off-road terrain contacts another vehicle in cases in which the driving support state is the off-road travel support state. Accordingly, there is little chance of image data generated by the processor that needs to be recorded not being recorded in the memory while in such a state.

A driving support system according to a sixth aspect of the present disclosure, in the first aspect, wherein the processor changes the recording condition to the specific recording condition only for a predetermined condition-change time period in cases in which the processor has determined the vehicle to be in any of the driving support states.

In the sixth aspect of the present disclosure, the processor changes the recording condition to the specific recording condition only for the predetermined condition change time period in cases in which the processor determines the vehicle to be in any of the driving support states. The respective specific recording conditions can be set in consideration of predetermined events that may befall the vehicle while the vehicle is in the respective driving support states. However, it is not necessarily the case that such events occur while the vehicle is in a driving support state. In the sixth aspect of the present disclosure, a time band when there is a higher likelihood of such events befalling the vehicle in a driving support state can be set as the condition change time period. Thus, there is little chance of the recording condition being changed to the specific recording condition corresponding to the driving support state when there is a low likelihood of such events befalling the vehicle in the driving support state.

As described above, the driving support system, the driving support method, and the non-transitory recording medium according to the present disclosure exhibit advantageous effects of enabling the chance of failing to record image data that needs to be recorded in the memory to be reduced, while also enabling the chance of recording image data that does not need to be recorded in the memory to be reduced.

BRIEF DESCRIPTION OF THE DRAWINGS

Exemplary embodiments of the present invention will be described in detail based on the following figures, wherein:

FIG. 22 is a flowchart illustrating processing performed by the ECU of the vehicle provided with a driving support system according to a third exemplary embodiment.

DETAILED DESCRIPTION

First Exemplary Embodiment

Figure 1:
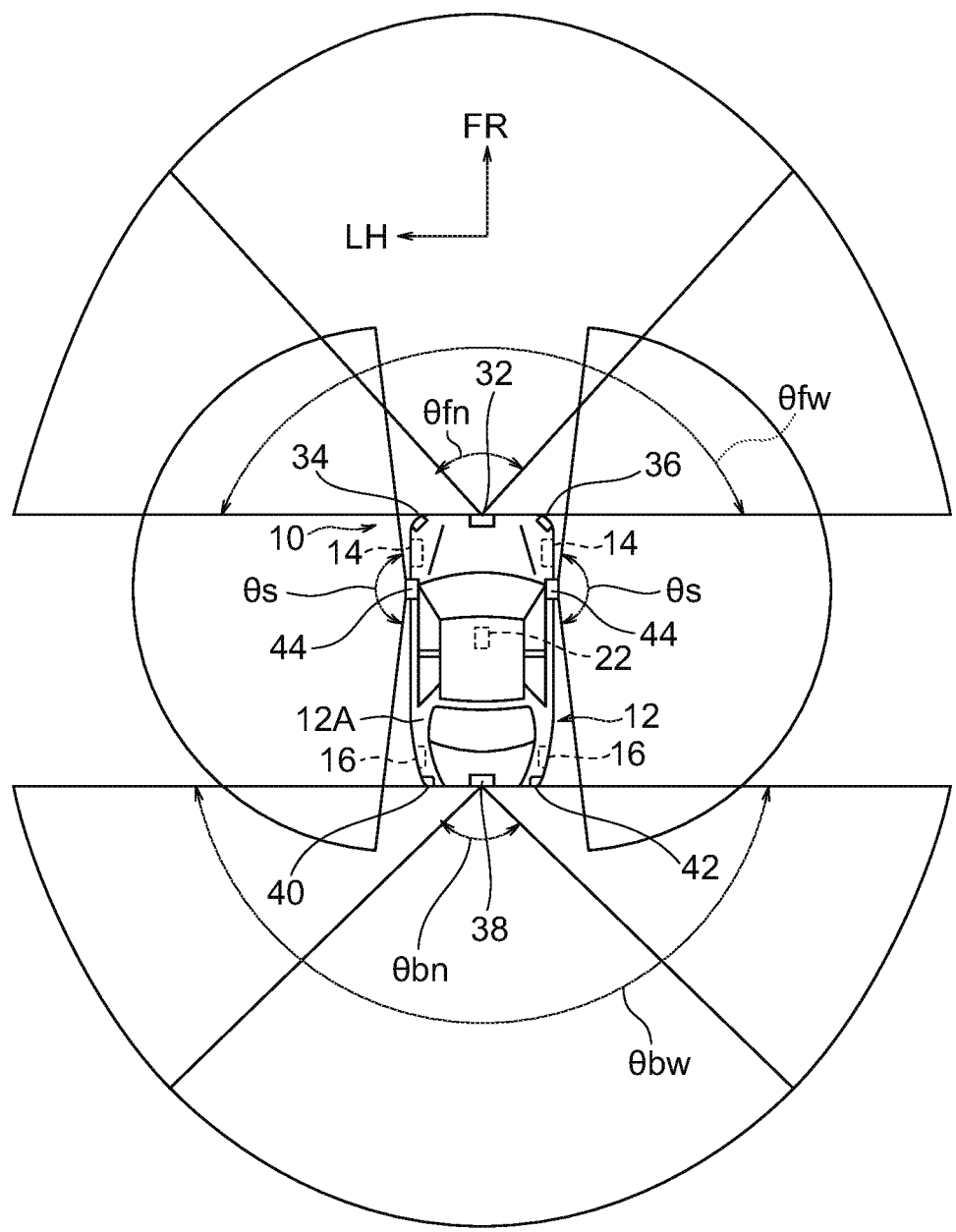
FIG. 1 is a schematic plan view illustrating a vehicle provided with a driving support system according to a first exemplary embodiment.

Explanation follows regarding a first exemplary embodiment of a driving support system 10, a driving support method, and a non-transitory recording medium according to the present disclosure, with reference to the drawings. Note that in the drawings, the arrow UP indicates an upper side in a vehicle vertical direction, the arrow FR indicates a front side in a vehicle front-rear direction, and the arrow LH indicates a left side in a vehicle left-right direction (vehicle width direction). In the following explanation, reference to the vertical direction, front-rear direction, and left-right direction refers to the vehicle vertical direction, the vehicle front-rear direction, and the vehicle left-right direction respectively.

FIG. 1 illustrates a vehicle 12 provided with the driving support system 10 of the first exemplary embodiment. The vehicle 12 includes two front wheels 14 and two rear wheels 16.

The vehicle 12 includes an engine, a torque converter, a transmission, a transfer case, a transfer case input shaft, and a transfer case output shaft. The transmission is a multi-speed automatic transmission, and the transmission speed is changed by an actuator (not illustrated in the drawings).

Figure 3:
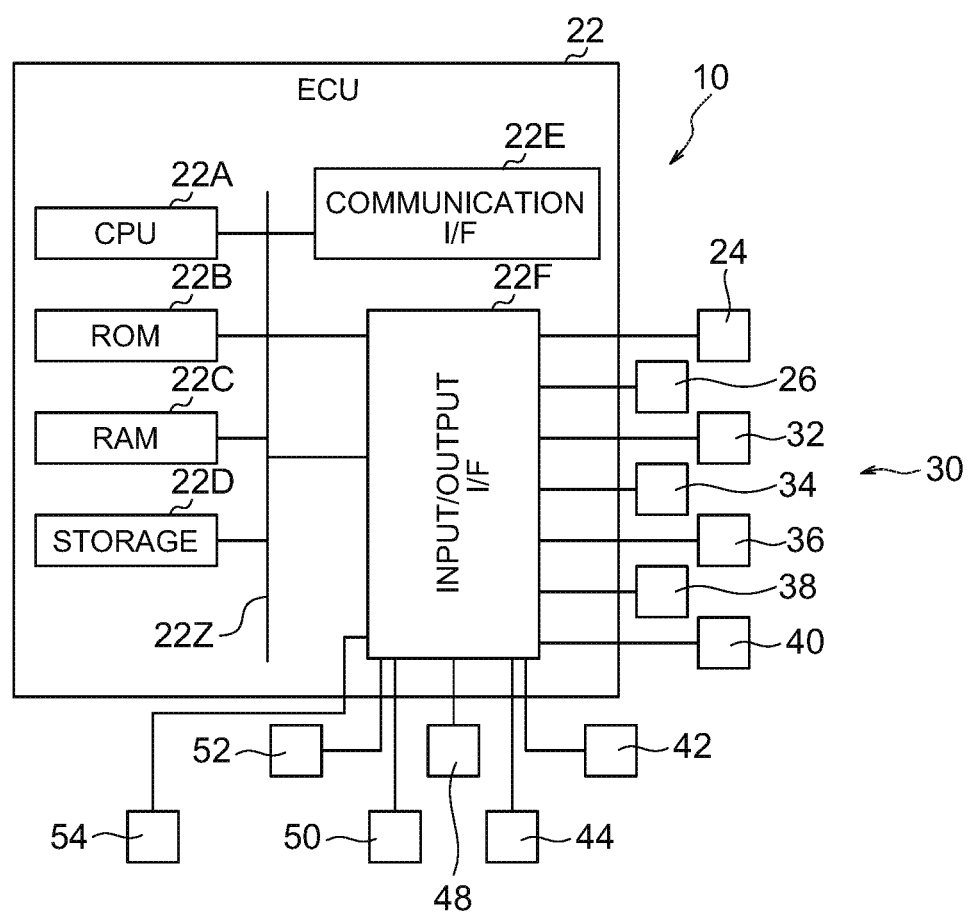
FIG. 3 is a control block diagram relating to control of the vehicle illustrated in FIG. 1.

As illustrated in FIG. 1 and FIG. 3, the vehicle 12 includes an electronic control unit (ECU) 22, serving as an example of a computer. The ECU 22 is configured including a central processing unit (CPU; a processor) 22A, a read only memory (ROM) 22B serving as a non-transitory recording medium, a random access memory (RAM) 22C serving as a non-transitory recording medium, a storage 22D serving as a non-transitory recording medium, a communication interface (I/F) 22E, and an input/output I/F 22F. The CPU 22A, the ROM 22B, the RAM 22C, the storage 22D, the communication I/F 22E, and the input/output I/F 22F are connected together through a bus 22Z so as to be capable of communicating with each other.

The CPU 22A is a central processing unit that executes various programs and controls various sections. Namely, the CPU 22A reads a program from the ROM 22B or the storage 22D, and executes the program using the RAM 22C as a workspace. The CPU 22A controls various configurations and performs various computation processing, described later, according to the program recorded in the ROM 22B or the storage 22D.

The ROM 22B holds various programs and various data. In the present exemplary embodiment, the ROM 22B is capable of recording image data output by an image processing section 222 (see FIG. 4), described later. The RAM 22C acts as a workspace that temporarily stores programs or data. The storage 22D is configured by a storage device such as a hard disk drive (HDD) or a solid state drive (SSD), and holds various programs and various data. The communication I/F 22E is an interface through which the ECU 22 communicates with other devices. This communication may, for example, employ a wireless communication protocol such as 4G, 5G, or Wi-Fi (registered trademark).

The input/output I/F 22F is an interface for communicating with various devices installed to the vehicle 12. As illustrated in FIG. 3, a selection switch 24, a shift lever position switch 26, a front-center camera 32 (imaging section), a front-left camera 34 (imaging section), a front-right camera 36 (imaging section), a rear-center camera 38 (imaging section), a rear-left camera 40 (imaging section), a rear-right camera 42 (imaging section), side cameras 44 (imaging sections), a display 48 (display section), a camera switch 50, a screen switching switch 52, and an acceleration sensor 54 (sensor), described later, are connected to the ECU 22 through the input/output I/F 22F.

Figures 4, 5:
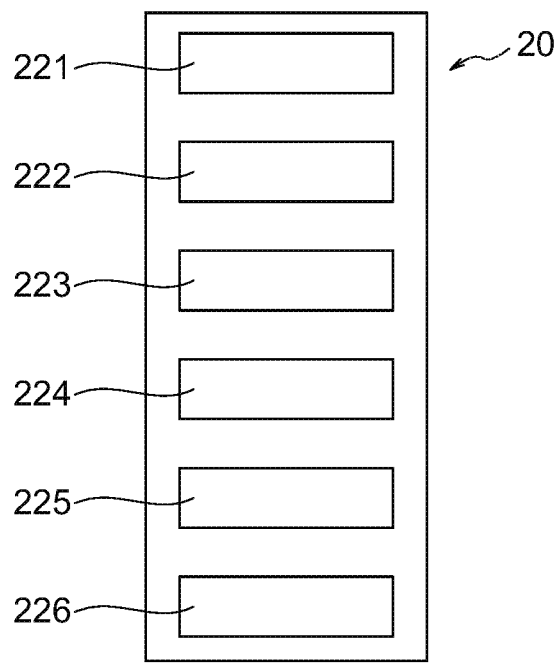
FIG. 4 is a functional block diagram of an ECU provided to the vehicle illustrated in FIG. 1.
FIG. 5 is a diagram illustrating a one-dimensional map recorded in a ROM illustrated in FIG. 4.

FIG. 4 is a block diagram illustrating an example of functional configuration of the ECU 22. Functional configuration of the ECU 22 includes a switchover control section 221, the image processing section 222, a recording control section 223, a recording condition change section 224, a condition-satisfaction determination section 225, and a support state determination section 226. The switchover control section 221, the image processing section 222, the recording control section 223, the recording condition change section 224, the condition-satisfaction determination section 225, and the support state determination section 226 are implemented by the CPU 22A, which serves as a processor (computer), reading and executing a control program stored in the ROM 22B or the storage 22D, which serves as a non-transitory recording medium.

Engine torque generated by the engine is transmitted to the transfer case input shaft through the torque converter and the transmission. The torque transmitted to the transfer case input shaft is always transmitted to the left and right front wheels 14 through the transfer case and the transfer case output shaft.

The ECU 22 is connected to the selection switch 24 (see FIG. 3) provided in a cabin of the vehicle 12. The position of the selection switch 24 is changed by operation by a driver D (see FIG. 2). The selection switch 24 can be moved to an H4 position, an H2 position, an L4 position, and an N position (neutral position).

The switchover control section 221 of the ECU 22 controls an actuator of the transfer case according to the position of the selection switch 24 in order to switch a power transmission state of the transfer case. When the selection switch 24 is positioned at the H4 position or the L4 position, the switchover control section 221 sets the power transmission state of the transfer case to a "four wheel drive state (4WD state) in which rotational torque (drive force) of the transfer case input shaft can be transmitted to the front wheels 14 and the rear wheels 16 through the transfer case output shaft".

When the selection switch 24 is positioned at the H2 position, the switchover control section 221 sets the power transmission state of the transfer case to a "two wheel drive state (2WD state) in which rotational torque of the transfer case input shaft is only transmitted to the front wheels 14 through the transfer case output shaft". Note that the transfer case may be configured such that rotational torque of the transfer case input shaft is only transmitted to the rear wheels 16 when the selection switch 24 is positioned at the H2 position.

The ECU 22 is also connected to the shift lever position switch 26 (see FIG. 3). The shift lever position switch 26 detects a shift position of a shift lever (not illustrated in the drawings) provided in the cabin, and transmits a shift position signal indicating the detection result to the ECU 22. The shift lever is, for example, capable of being moved to respective shift positions including a D (drive) range, an R (reverse) range, a P (parking) range, and an N (neutral) range. Namely, the vehicle 12 is an automatic transmission (AT) vehicle.

On receipt of a shift position signal from the shift lever position switch 26, the ECU 22 changes the transmission speed (gear). Namely, when the shift position is the D range, the transmission speed is set to a forward driving gear. When the shift position is the R range, the transmission speed is set to a reversing gear. When the shift position is the N range, the transmission is placed in a neutral state. When the shift position is the P range, the transmission is placed in a parking state.

The driving support system 10 includes the ECU 22, the selection switch 24, the shift lever position switch 26, and a drive recorder 30.

Figure 2:
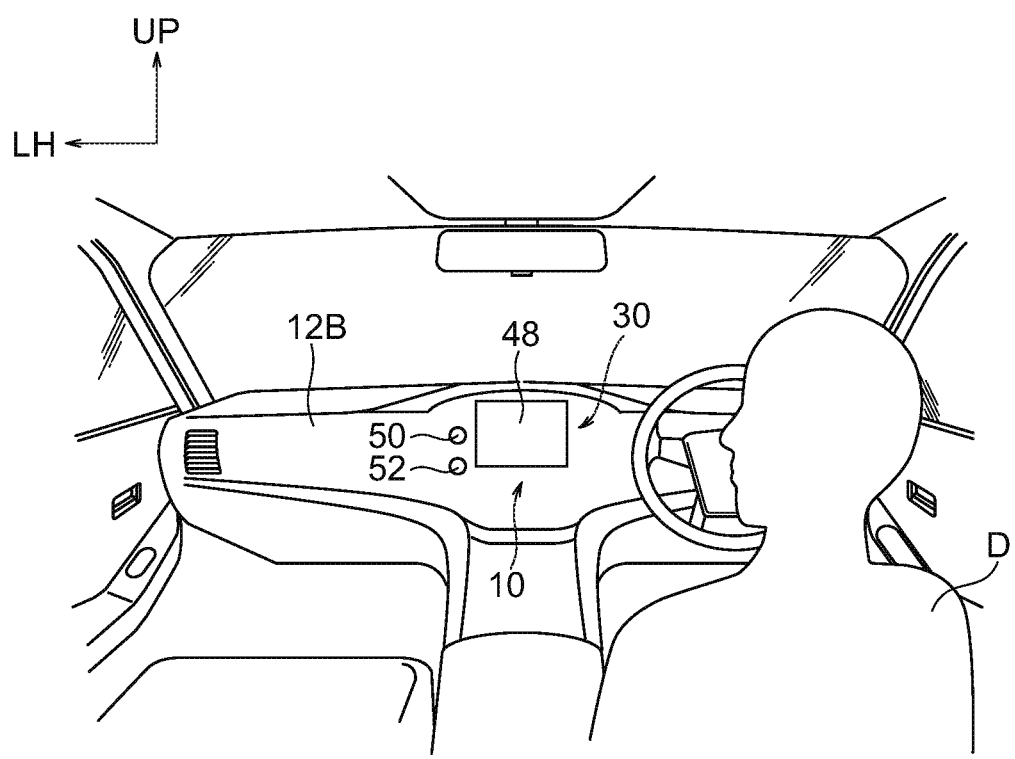
FIG. 2 is a diagram illustrating the interior of the vehicle illustrated in FIG. 1.

As illustrated in FIG. 2 and FIG. 3, the drive recorder 30 includes the front-center camera 32 (imaging section), the front-left camera 34 (imaging section), the front-right camera 36 (imaging section), the rear-center camera 38 (imaging section), the rear-left camera 40 (imaging section), the rear-right camera 42 (imaging section), the side cameras 44 (imaging sections), the display 48 (display section), the camera switch 50, the screen switching switch 52, and the acceleration sensor 54 (sensor).

As illustrated in FIG. 1, the front-center camera 32 is fixed to a vehicle width direction central portion of a front end section of a vehicle body 12A. The front-left camera 34 is fixed to a left end portion of the front end section of the vehicle body 12A, and the front-right camera 36 is fixed to a right end portion of the front end section of the vehicle body 12A. The front-center camera 32, the front-left camera 34, and the front-right camera 36 are capable of imaging subjects positioned to the front side of the vehicle 12. $\theta fn$ in FIG. 1 indicates a view angle of the front-center camera 32.

As illustrated in FIG. 1, the rear-center camera 38 is fixed to a vehicle width direction central portion of a rear end section of the vehicle body 12A. The rear-left camera 40 is fixed to a left end portion of the rear end section of the vehicle body 12A. The rear-right camera 42 is fixed to a right end portion of the rear end section of the vehicle body 12A. The rear-center camera 38, the rear-left camera 40, and the rear-right camera 42 are capable of imaging subjects positioned to the rear side of the vehicle 12. $\theta bn$ in FIG. 1 indicates a view angle of the rear-center camera 38.

As illustrated in FIG. 1, the side cameras 44 are fixed to respective left and right side sections of the vehicle body 12A. The side camera 44 on the left side is capable of imaging imaging subjects positioned to the left side of the vehicle 12. The side camera 44 on the right side is capable of imaging subjects positioned to the right side of the vehicle 12. $\theta s$ in FIG. 1 indicates view angles of the left and right side cameras 44.

The front-center camera 32, the front-left camera 34, the front-right camera 36, the rear-center camera 38, the rear-left camera 40, the rear-right camera 42, and the side cameras 44 repeatedly execute an imaging operation at predetermined time intervals, and repeatedly transmit electrical signals generated thereby to the ECU 22. The image processing section 222 generates image data by performing image processing on the received electrical signals at predetermined time intervals.

The image processing section 222 is capable of generating narrow front image data Imfn (see FIG. 7) based on the electrical signals received from the front-center camera 32.

The image processing section 222 is also capable of generating wide front image data Imfw (see FIG. 13) by merging respective image data generated based on the electrical signals received from the front-center camera 32, the front-left camera 34, and the front-right camera 36 and performing known viewpoint conversion processing thereon. As illustrated in FIG. 1, the view angle of the wide front image data is denoted θfw, this being wider than θfn.

The image processing section 222 is also capable of generating narrow back image data Imbn (see FIG. 15) based on the electrical signals received from the rear-center camera 38. The image processing section 222 is also capable of generating wide back image data Imbw (see FIG. 17) by merging respective image data generated based on the electrical signals received from the rear-center camera 38, the rear-left camera 40, and the rear-right camera 42 and performing viewpoint conversion processing thereon. As illustrated in FIG. 1, the view angle of the wide back image data is denoted θbw, this being wider than θbn.

The image processing section 222 is also capable of generating left side image data Imls and right side image data Imrs (see FIG. 9 and FIG. 11) based on the electrical signals received from the respective side cameras 44.

The image processing section 222 is also capable of identifying imaging subjects in the generated image data, for example by employing edge detection and pattern matching. For example, in cases in which an object installed in a parking space is included in the narrow back image data Imbn, the image processing section 222 is capable of identifying whether this object is a wheel stopper.

As illustrated in FIG. 2, the display 48 is provided to an instrument panel 12B of the vehicle 12. The camera switch 50 and the screen switching switch 52 are also provided to the instrument panel 12B. The driver D of the vehicle 12 operates the camera switch 50 in order to set the display 48 to a display state displaying image data generated by the image processing section 222 (for example the narrow front image data Imfn). When the image data is displayed on the display 48, the driver D is able to change the image data displayed on the display 48 (for example the narrow front image data Imfn) to other image data (for example the wide front image data Imfw) by operating the camera switch 50 or the screen switching switch 52. Moreover, the display 48 can be switched to a non-display state in which image data is not displayed by operating the camera switch 50 while image data is displayed on the display 48. In the present exemplary embodiment, the image data displayed on the display 48 is changed in the following manner.

First, explanation follows regarding a case in which an ignition switch (not illustrated in the drawings) provided in the vehicle 12 is positioned at an ON position and the selection switch 24 is at any position out of the H2 position, the H4 position, or the L4 position. Hereafter, a state of the vehicle 12 when the ignition switch is positioned at the ON position and the selection switch 24 is positioned at the H2 position is referred to as a "2WD driving state". A state of the vehicle 12 when the ignition switch is positioned at the ON position and the selection switch 24 is positioned at the H4 position or the L4 position is referred to as a "4WD driving state".

Figure 6:
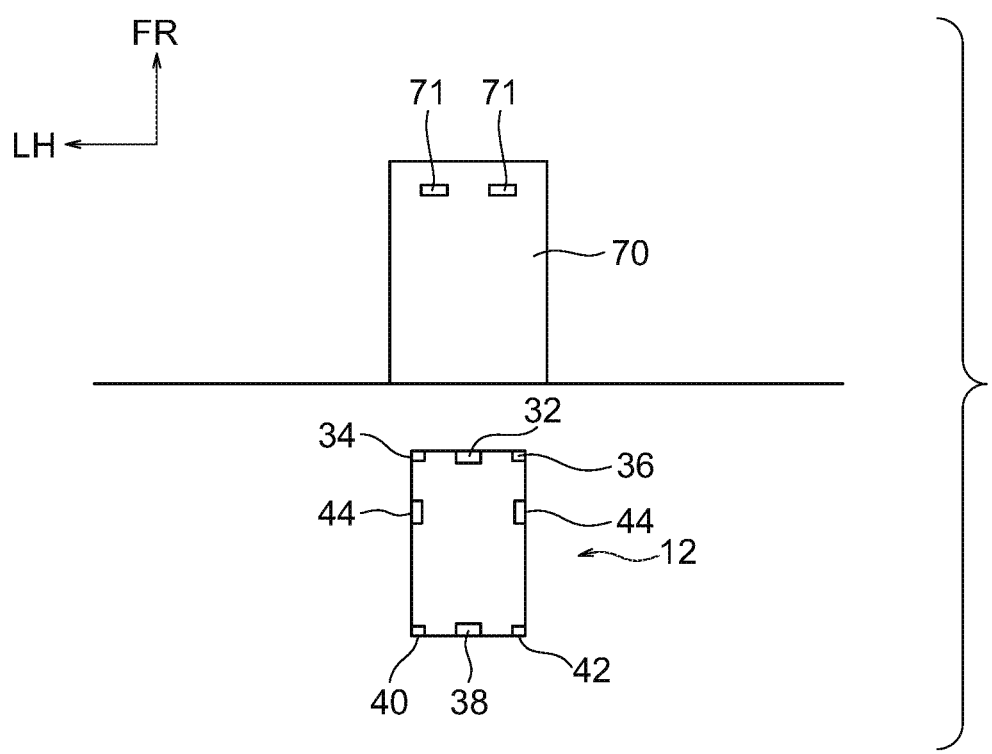
FIG. 6 is a plan view illustrating a vehicle driving forward into a parking space when in a parking support state.
Figure 7:
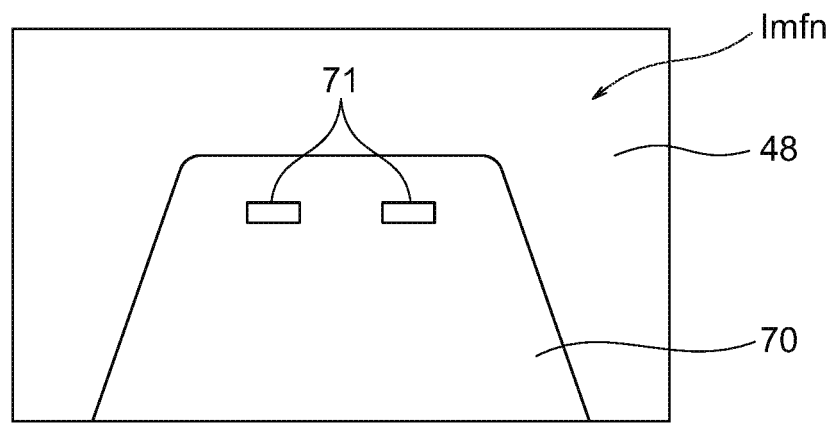
FIG. 7 is a diagram illustrating a display in the vehicle illustrated in FIG. 6.

The following explanation envisages a case in which the vehicle 12 is in the 2WD driving state or the 4WD driving state, and the ECU 22 has determined the shift lever to be in the D range based on a signal from the shift lever position switch 26. For example, as illustrated in FIG. 6, such a state arises in cases in which the vehicle 12 is entering a parking space 70 from its front end section in order to park in the parking space 70. In such cases, when the driver D operates the camera switch 50, the narrow front image data Imfn generated by the image processing section 222 is displayed on the display 48 as illustrated in FIG. 7. When this is performed, the parking space 70 and a pair of left and right wheel stoppers 71 installed in the parking space 70 are depicted in the narrow front image data Imfn displayed on the display 48.

In cases in which the vehicle 12 is in the 2WD driving state or the 4WD driving state, the shift lever is in the D range, and the narrow front image data Imfn is displayed on the display 48 in this manner, the support state determination section 226 of the ECU 22 determines that "the driving support state of the vehicle 12 is a parking support state". The driver D of the vehicle 12 can receive parking support by looking at the image data displayed on the display 48.

Figure 8:
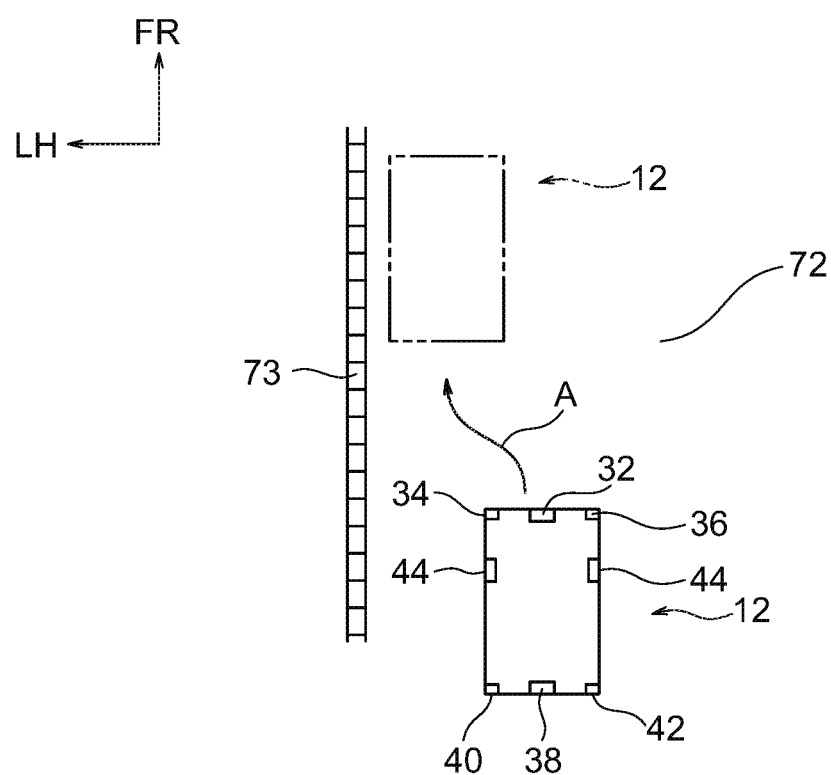
FIG. 8 is a plan view illustrating a vehicle executing parallel parking when in a side monitoring support state.
Figure 9:
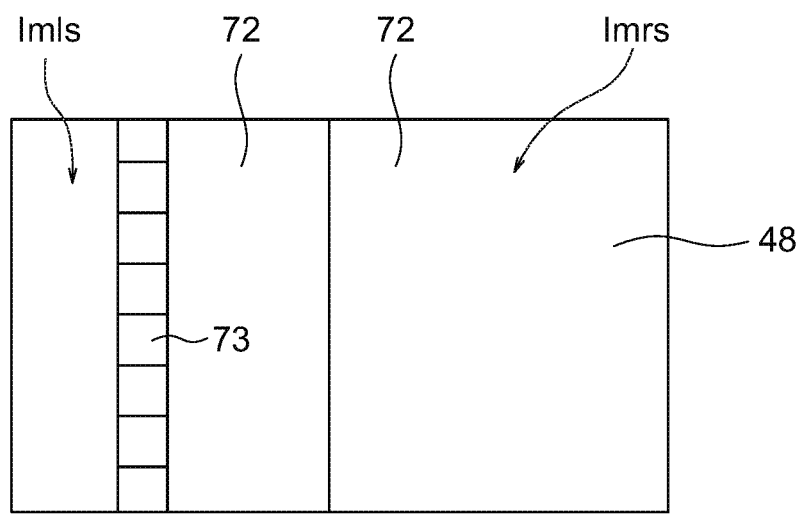
FIG. 9 is a diagram illustrating the display in the vehicle illustrated in FIG. 8.

Next, a case is envisaged in which the vehicle 12 is in the 2WD driving state or the 4WD driving state, the shift lever is in the D range, and the vehicle 12 is driving forward along a road 72, illustrated in FIG. 8. The vehicle 12 drives forward along the road 72 while moving toward a curb 73 provided at a left edge of the road 72 as indicated by the direction of arrow A in order to parallel park at the position illustrated by an imaginary line. When the vehicle 12 is positioned at the position illustrated by solid lines in FIG. 8, the narrow front image data Imfn is displayed on the display 48. If the driver D operates the camera switch 50 while the vehicle 12 is stationary at the position illustrated by the solid lines in FIG. 8, the left side image data Imls generated by the image processing section 222 is displayed on a left half of the display 48, and the right side image data Imrs generated by the image processing section 222 is displayed on a right half of the display 48 as illustrated in FIG. 9. The curb 73 is included in the left side image data Imls as illustrated in FIG. 9 when the vehicle 12 has moved to the position indicated by the imaginary line in FIG. 8.

Figure 10:
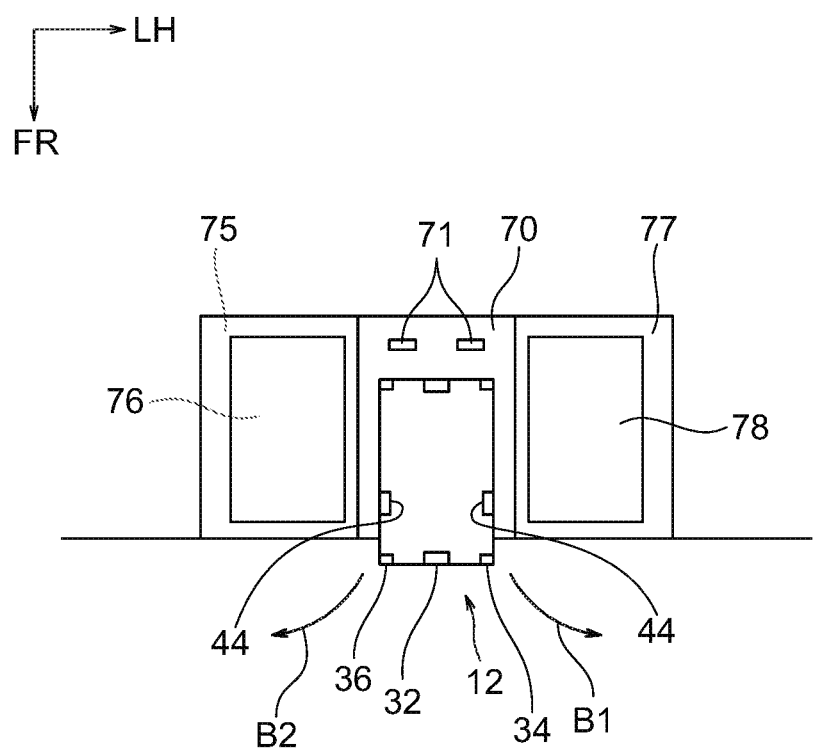
FIG. 10 is a plan view illustrating a vehicle driving forward out of a parking space when in the side monitoring support state.
Figure 11:
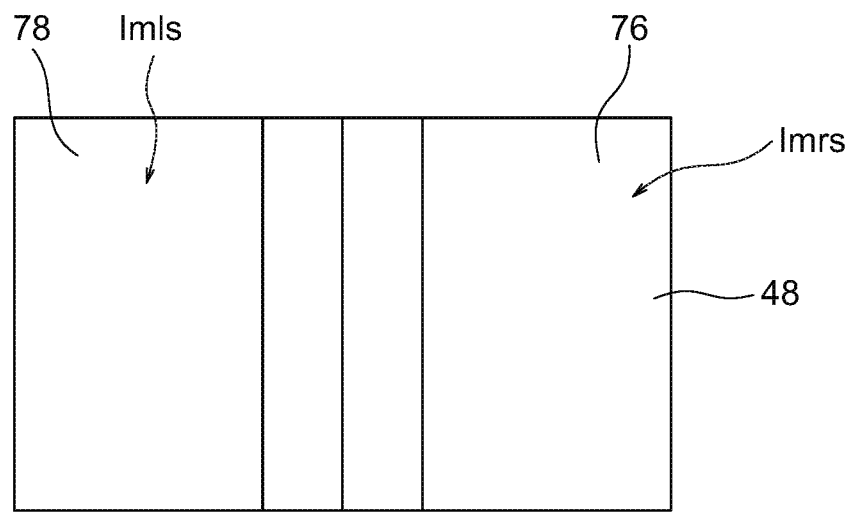
FIG. 11 is a diagram illustrating a display in the vehicle illustrated in FIG. 10.

Next, a case is envisaged in which the vehicle 12 is in the 2WD driving state or the 4WD driving state, the shift lever is in the D range, and the vehicle 12 is driving forward to leave the parking space 70, as illustrated in FIG. 10. As illustrated in FIG. 10, other vehicles 76, 78 are parked in parking spaces 75, 77 located at the left and right sides of the parking space 70. Namely, the vehicle 12 is passing out from between the other vehicle 76 and the other vehicle 78. When this is performed, as illustrated in FIG. 11, the left side image data Imls is displayed in the left half of the display 48, and the right side image data Imrs is displayed in the right half of the display 48. A right section of the other vehicle 78 is included in the left side image data Imls, and a left section of the other vehicle 76 is included in the right side image data Imrs.

In cases in which the vehicle 12 is in the 2WD driving state or the 4WD driving state, the shift lever is in the D range, and the left side image data Imls and the right side image data Imrs are displayed on the display 48 in this manner, the support state determination section 226 determines that "the driving support state of the vehicle 12 is a side monitoring support state". Likewise, in cases in which the vehicle 12 is in the 2WD driving state or the 4WD driving state, the shift lever is in the R range, and the left side image data Imls and the right side image data Imrs are displayed on the display 48, the support state determination section 226 determines that "the driving support state of the vehicle 12 is a side monitoring support state". The driver D of the vehicle 12 can receive the side monitoring support by looking at the image data displayed on the display 48.

Figure 12:
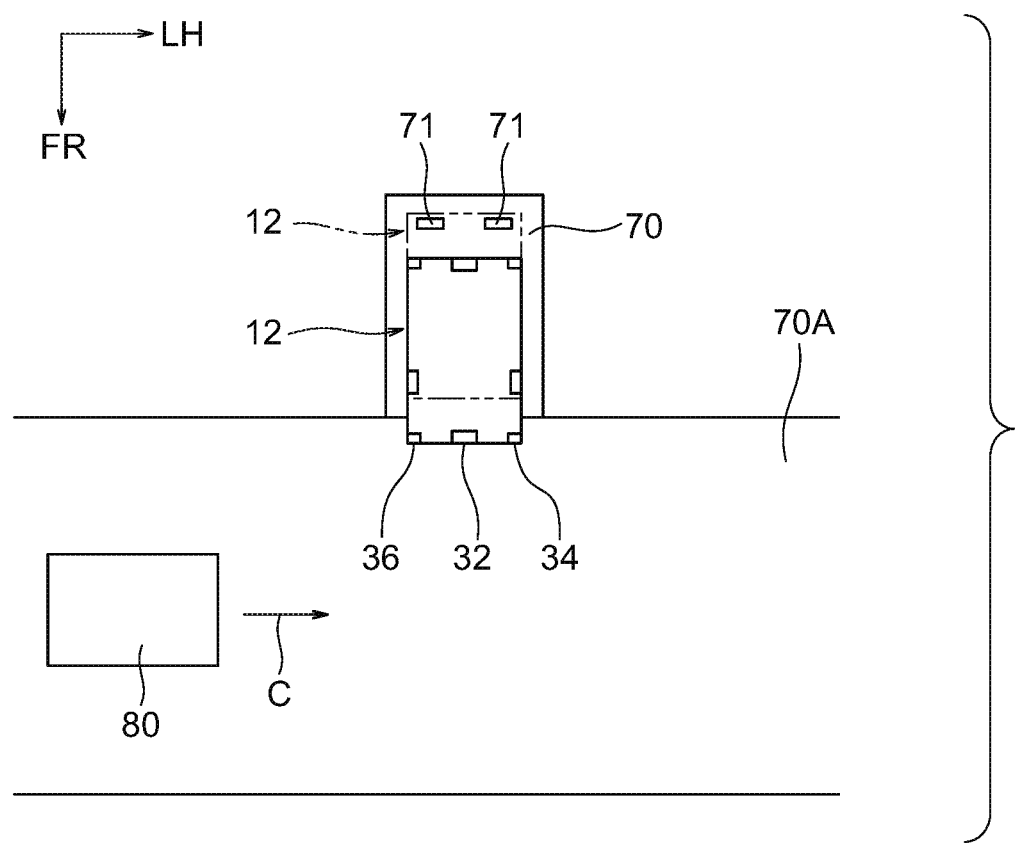
FIG. 12 is a plan view illustrating a vehicle leaving a parking space when in a parking-exit support state.
Figure 13:
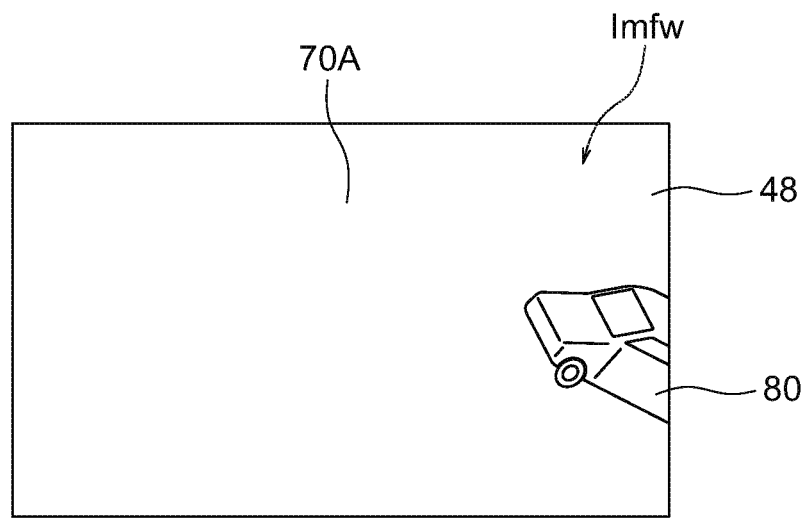
FIG. 13 is a diagram illustrating the display in the vehicle illustrated in FIG. 12.

Next, a case is envisaged in which the vehicle 12 is in the 2WD driving state or the 4WD driving state, the shift lever is in the D range, and the vehicle 12 is driving forward to leave the parking space 70, as illustrated in FIG. 12. No obstacles (such as other vehicles) are present on either the left or right side of the parking space 70. The vehicle 12 drives forward from the position indicated by imaginary line in FIG. 12. The parking space 70 is provided at a side edge of a road 70A. Another vehicle 80 is driving forward along the road 70A in the direction indicated by the arrow C. A state is envisaged in which the vehicle 12 is stationary at the position indicated by imaginary line in FIG. 12 and the narrow front image data Imfn is displayed on the display 48. When the driver D operates the screen switching switch 52 in this state, the wide front image data Imfw generated by the image processing section 222 is displayed on the display 48, as illustrated in FIG. 13. When the vehicle 12 moves from the position indicated by an imaginary line to the position illustrated by solid lines in FIG. 12, the wide front image data Imfw including the other vehicle 80 is displayed on the display 48, as illustrated in FIG. 13.

In cases in which the vehicle 12 is in the 2WD driving state or the 4WD driving state, the shift lever is in the D range, and the wide front image data Imfw is displayed on the display 48 in this manner, the support state determination section 226 determines that "the driving support state of the vehicle 12 is a parking-exit support state". The driver D of the vehicle 12 can receive the parking-exit support by looking at the image data displayed on the display 48.

Figure 14:
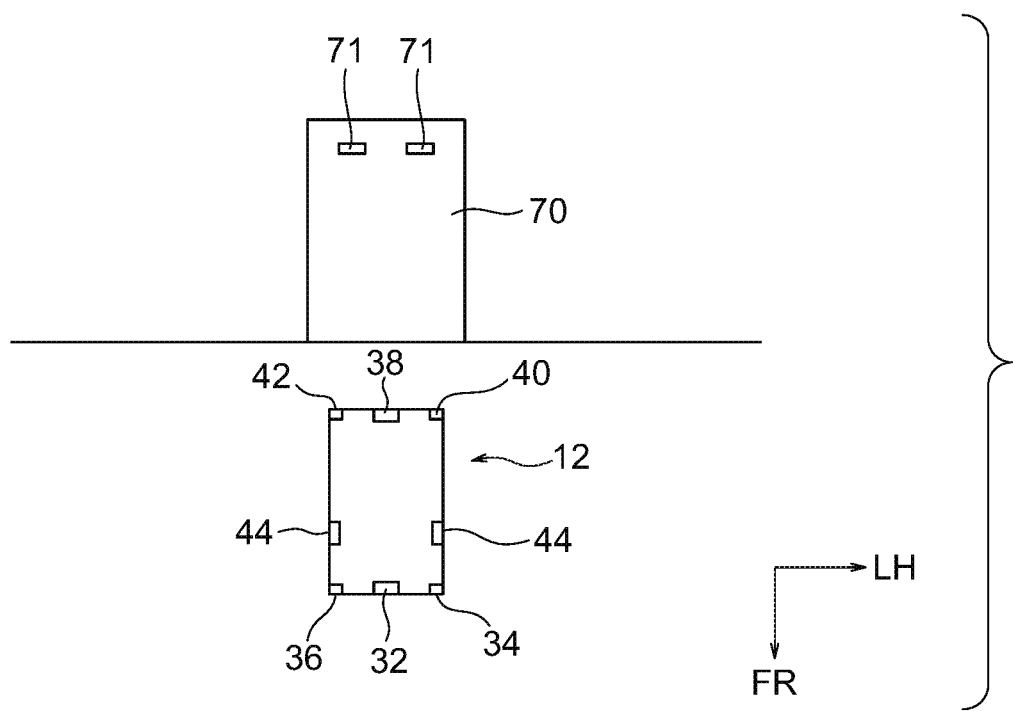
FIG. 14 is a plan view illustrating a vehicle reversing into a parking space when in a parking support state.

Next, a case is envisaged in which the vehicle 12 is in the 2WD driving state or the 4WD driving state and the ECU 22 determines the shift lever to be in the R range. For example, as illustrated in FIG. 14, such a state arises in cases in which the vehicle 12 is entering the parking space 70 from its rear end section in order to park in the parking space 70.

Figure 15:
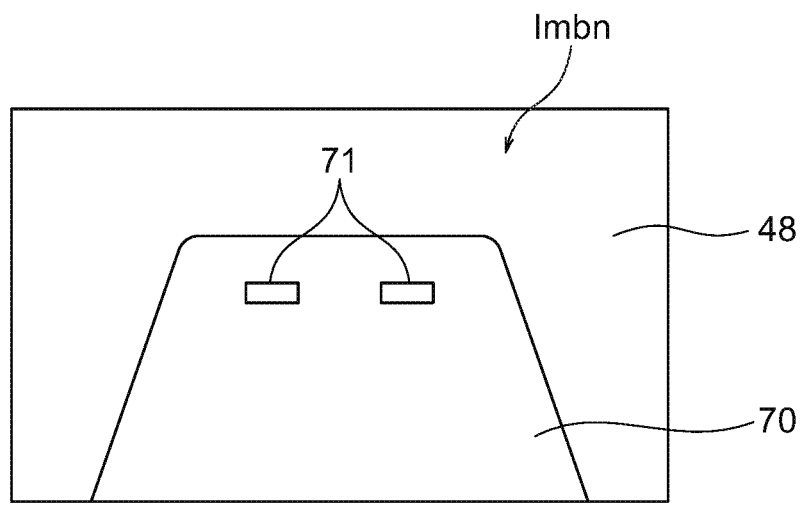
FIG. 15 is a diagram illustrating the display in the vehicle illustrated in FIG. 14.

In such cases, when the driver D operates the camera switch 50, the narrow back image data Imbn generated by the image processing section 222 is displayed on the display 48 as illustrated in FIG. 15. When this is performed, the parking space 70 and the pair of left and right wheel stoppers 71 are depicted in the narrow back image data Imbn displayed on the display 48.

In cases in which the vehicle 12 is in the 2WD driving state or the 4WD driving state, the shift lever is in the R range, and the narrow back image data Imbn is displayed on the display 48 in this manner, the support state determination section 226 determines that "the driving support state of the vehicle 12 is a parking support state". The driver D of the vehicle 12 can receive parking support by looking at the image data displayed on the display 48.

Figure 16:
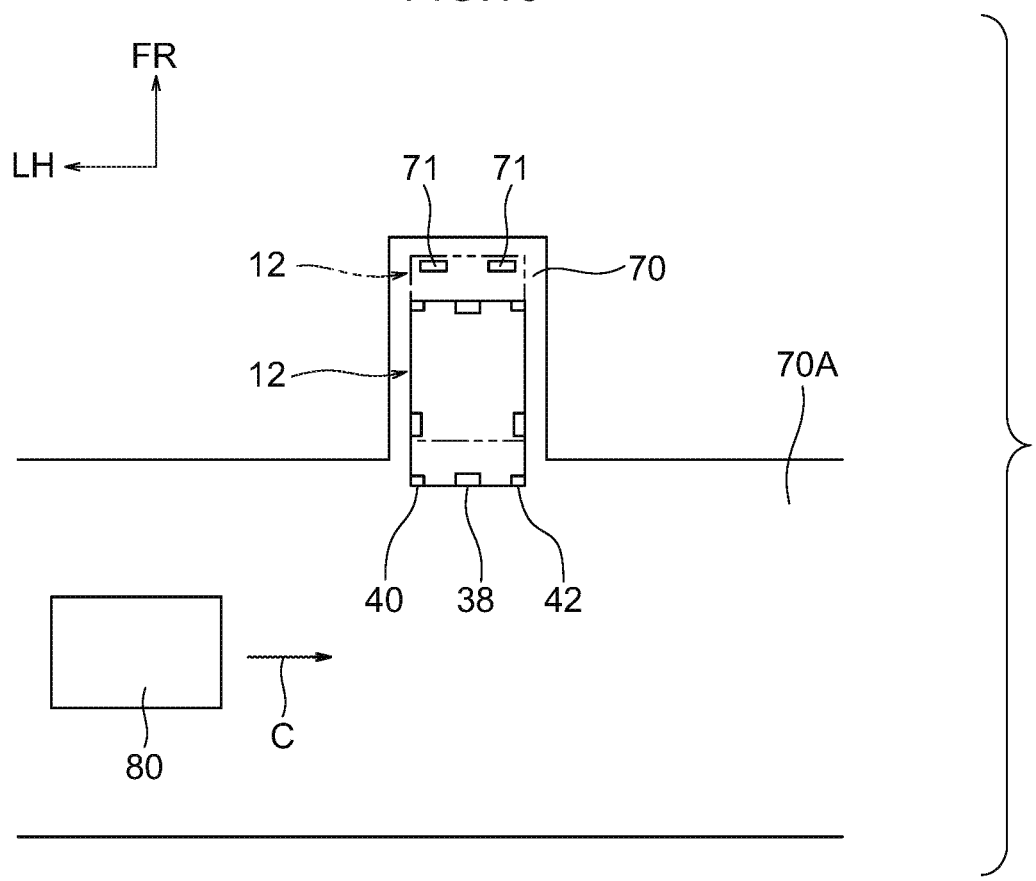
FIG. 16 is a plan view illustrating a vehicle reversing out of a parking space when in the side monitoring support state.
Figure 17:
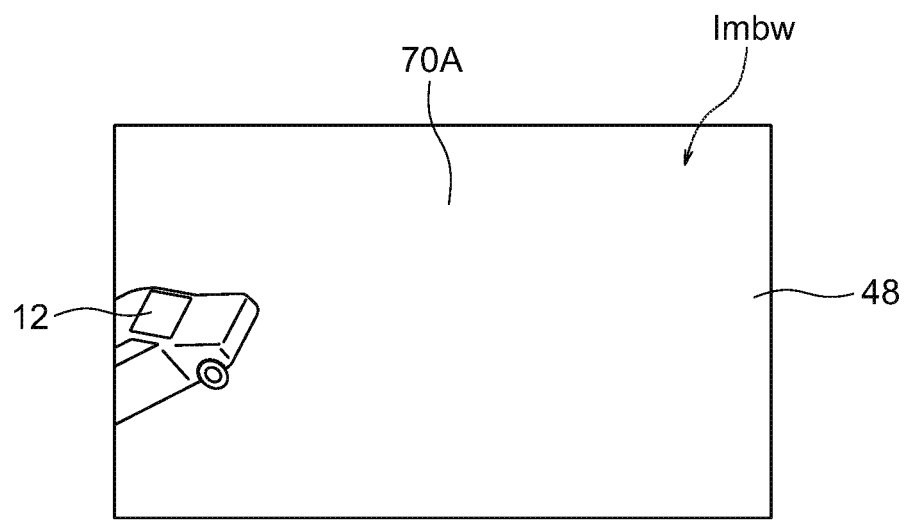
FIG. 17 is a diagram illustrating the display in the vehicle illustrated in FIG. 16.

Next, a case is envisaged in which the vehicle 12 is in the 2WD driving state or the 4WD driving state, the shift lever is in the R range, and the vehicle 12 is reversing out of the parking space 70, as illustrated in FIG. 16. The vehicle 12 is reversing out from the position illustrated by an imaginary line in FIG. 16. The parking space 70 is the parking space 70 illustrated in FIG. 12, and the other vehicle 80 is driving forward along the road 70A in the direction of the arrow C. A state is envisaged in which the vehicle 12 is stationary at the position indicated by the imaginary line in FIG. 16 with the narrow back image data Imbn displayed on the display 48. When the driver D operates the screen switching switch 52 in this state, the wide back image data Imbw generated by the image processing section 222 is displayed on the display 48, as illustrated in FIG. 17. When the vehicle 12 moves from the position illustrated by the imaginary line to the position illustrated by solid lines in FIG. 16, the wide back image data Imbw including the other vehicle 80 is displayed on the display 48, as illustrated in FIG. 17.

In cases in which the vehicle 12 is in the 2WD driving state or the 4WD driving state, the shift lever is in the R range, and the wide back image data Imbw is displayed on the display 48 in this manner, the support state determination section 226 of the ECU 22 determines that "the driving support state of the vehicle 12 is a parking-exit support state". The driver D of the vehicle 12 can receive the parking-exit support by looking at the image data displayed on the display 48.

Figure 18:
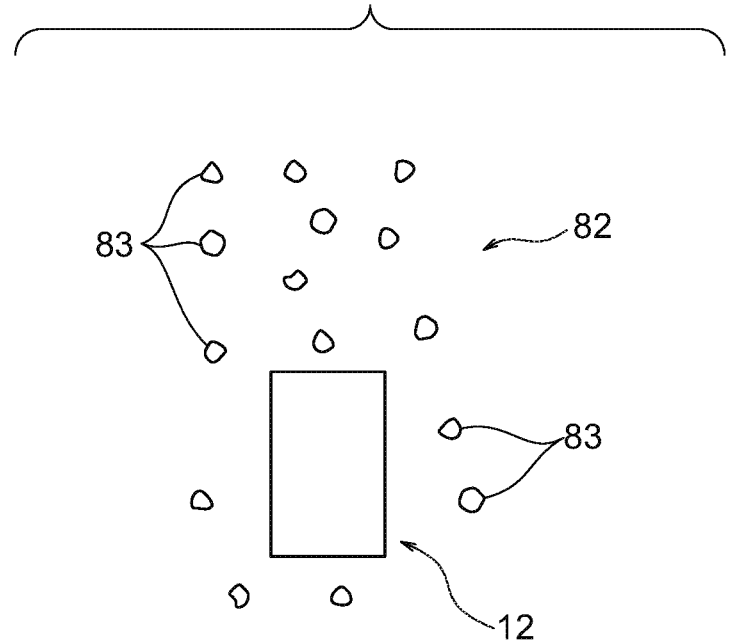
FIG. 18 is a plan view illustrating a vehicle traveling on an off-road terrain when in an off-road travel support state.
Figure 19:
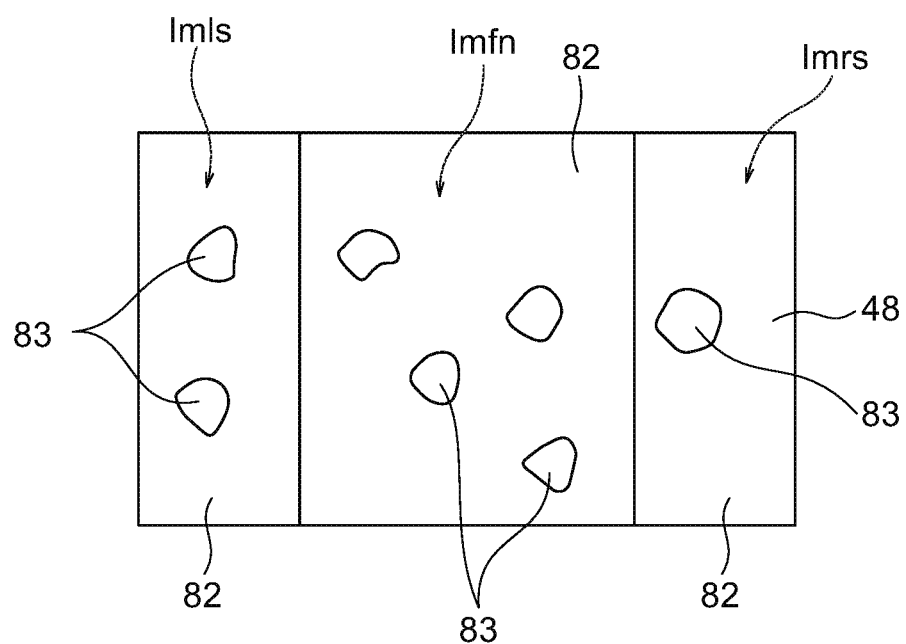
FIG. 19 is a diagram illustrating the display in the vehicle illustrated in FIG. 18.

Next, a case is envisaged in which the vehicle 12 is in the 4WD driving state, and the ECU 22 determines the shift lever to be in either the D range or the R range based on a signal from the shift lever position switch 26. For example, as illustrated in FIG. 18, such a state arises in cases in which the vehicle 12 is driving forward along an off-road terrain 82 with the shift lever positioned in the D range. When the driver D operates the camera switch 50 in such cases, the narrow front image data Imfn, the left side image data Imls, and the right side image data Imrs which are generated by the image processing section 222 are displayed on the display 48, as illustrated in FIG. 19. Note that in cases in which the driver D operates the camera switch 50 when the shift lever is positioned in the R range, the narrow back image data Imbn, the left side image data Imls, and the right side image data Imrs which are generated by the image processing section 222 are displayed on the display 48.

In cases in which the vehicle 12 is in the 4WD driving state, the shift lever is in the D range or the R range, and either the narrow front image data Imfn, the left side image data Imls, and the right side image data Imrs, or the narrow back image data Imbn, the left side image data Imls, and the right side image data Imrs are displayed on the display 48 in this manner, the support state determination section 226 determines that "the driving support state of the vehicle 12 is an off-road travel support state". The driver D of the vehicle 12 can receive the off-road travel support by looking at the image data displayed on the display 48.

Note that if the driver D operates at least one of the camera switch 50 or the screen switching switch 52 after operating the camera switch 50, the display 48 displays the same type of image data as the image data illustrated in FIG. 7, FIG. 9, FIG. 11, FIG. 13, FIG. 15, or FIG. 17. Namely, the driving support state of the vehicle 12 switches from the off-road travel support state to the parking-exit support state, the side monitoring support state, or the parking support state.

Note that the display 48 is capable of displaying panoramic view image data (not illustrated in the drawings) when the shift lever is positioned in the D range, the R range, the P range, or the N range while in the 2WD driving state or the 4WD driving state. Panoramic view image data is image data generated by the image processing section 222 based on electrical signals transmitted from the front-center camera 32, the front-left camera 34, the front-right camera 36, the rear-center camera 38, the rear-left camera 40, the rear-right camera 42, and the side cameras 44. The panoramic view image data corresponds to a plan view image of the vehicle 12 and its surroundings from above. The camera switch 50 and the screen switching switch 52 may be operated to display either the panoramic view image data alone or the panoramic view image data together with other image data (for example the narrow front image data Imfn or the narrow back image data Imbn) on the display 48.

As illustrated in FIG. 3, the vehicle 12 is provided with the acceleration sensor 54. The acceleration sensor 54 of the present exemplary embodiment is a triaxial semiconductor acceleration sensor, and detects acceleration of the vehicle 12 in three directions, namely in the front-rear direction, the left-right direction (vehicle width direction), and the vertical direction. An output signal of the acceleration sensor 54 is input to the ECU 22. Note that the acceleration sensor 54 may be configured by an acceleration sensor other than a semiconductor acceleration sensor. The acceleration sensor 54 transmits information relating to the detected acceleration to the ECU 22 at predetermined time intervals.

The condition-satisfaction determination section 225 of the ECU 22 determines whether or not acceleration of the vehicle 12 has exceeded a predetermined threshold value, based on the threshold value relating to the acceleration and the acceleration information transmitted from the acceleration sensor 54. In cases in which the acceleration exceeds the threshold value, the condition-satisfaction determination section 225 determines "a recording condition to have been satisfied". In cases in which the condition-satisfaction determination section 225 determines that the recording condition has been satisfied, the recording control section 223 of the ECU 22 causes the image data displayed on the display 48 for a predetermined time band (referred to hereafter as a recording time band), including a timing at which acceleration exceeding the threshold value was detected by the acceleration sensor 54, to be recorded in the ROM 22B of the ECU 22.

The threshold values are recorded as a one-dimensional map (look-up table) 57 such as that illustrated in FIG. 5 in the ROM 22B of the ECU 22. A first threshold value, a second threshold value, a third threshold value, a fourth threshold value have a magnitude relationship of first threshold value<second threshold value<third threshold value<fourth threshold value. Note that an initial value of the threshold value is a threshold value In. Namely, when the ignition switch is switched from an OFF position to the ON position or when the vehicle 12 is not in any driving support state, the recording condition change section 224 sets the threshold value In as the aforementioned threshold value. The threshold value In is a different value than the first threshold value, the second threshold value, the third threshold value, and the fourth threshold value.

A specific recording condition is satisfied when the acceleration detected by the acceleration sensor 54 is determined by the condition-satisfaction determination section 225 to be larger than either the first threshold value, the second threshold value, the third threshold value, or the fourth threshold value.

The one-dimensional map 57 stipulates the first threshold value, the second threshold value, the third threshold value, and the fourth threshold value according to the driving support states of the vehicle 12. In cases in which the support state determination section 226 determines that "the driving support state of the vehicle 12 is the parking-exit support state", the recording condition change section 224 of the ECU 22 changes the threshold value to the first threshold value. In cases in which the support state determination section 226 determines that "the driving support state of the vehicle 12 is the side monitoring support state", the recording condition change section 224 changes the threshold value to the second threshold value. In cases in which the support state determination section 226 determines that "the driving support state of the vehicle 12 is the parking support state", the recording condition change section 224 changes the threshold value to the third threshold value. In cases in which the support state determination section 226 determines that "the driving support state of the vehicle 12 is the off-road travel support state", the recording condition change section 224 changes the threshold value to the fourth threshold value. The first threshold value, the second threshold value, the third threshold value, and the fourth threshold value are set in consideration of predetermined events that may befall the vehicle 12 when the vehicle 12 is in the respective driving support states corresponding to the respective threshold values.

Figure 20:
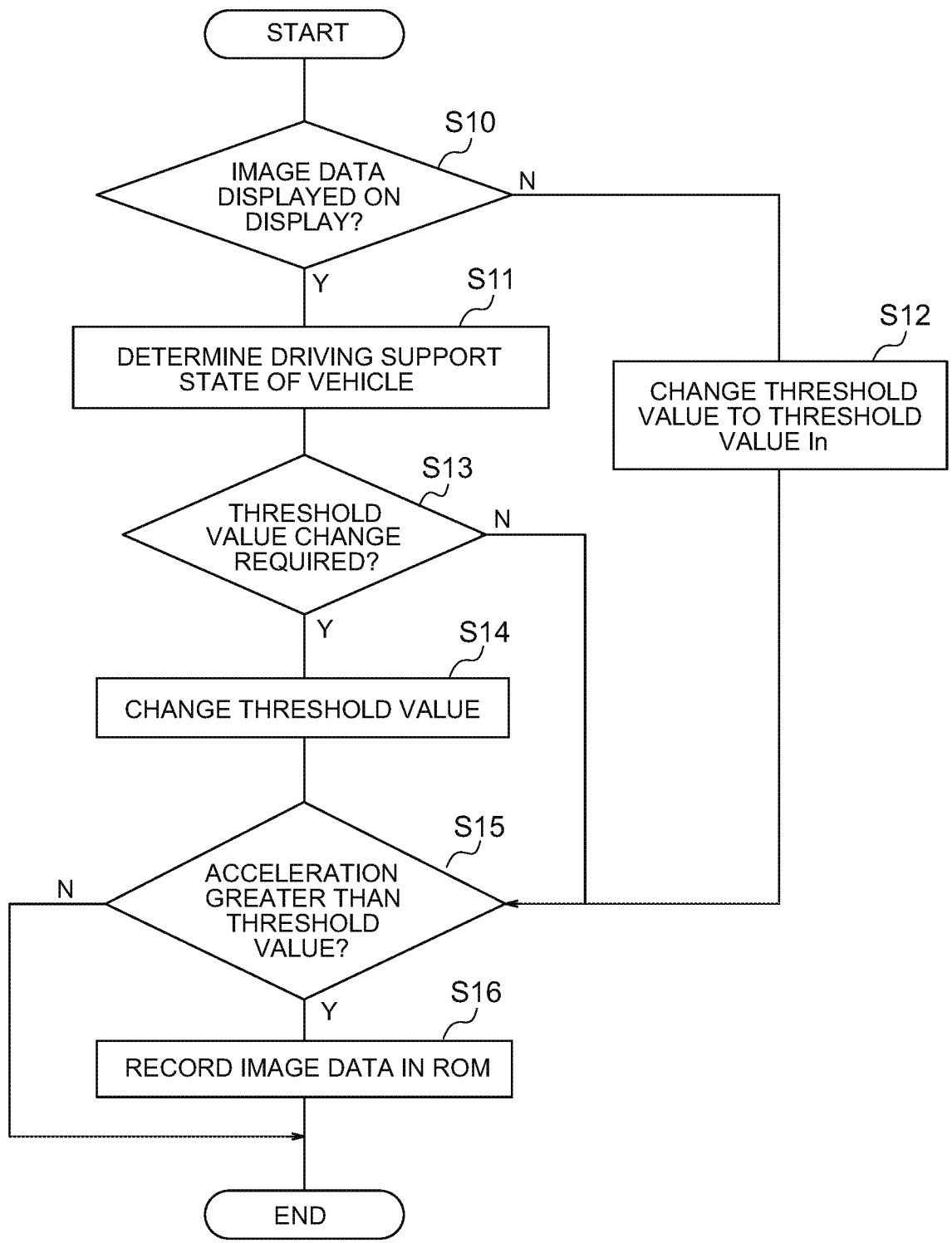
FIG. 20 is a flowchart illustrating processing performed by the ECU of the vehicle illustrated in FIG. 1.

Next, explanation follows regarding a flow of processing performed by the ECU 22 of the driving support system 10 of the present exemplary embodiment, with reference to the flowchart in FIG. 20. The ECU 22 executes the processing in the flowchart of FIG. 20 at predetermined time intervals when the ignition switch is positioned at the ON position and the selection switch 24 is at any out of the H4 position, the H2 position, or the L4 position.

First, at step S10, the ECU 22 determines whether or not image data is displayed on the display 48.

The ECU 22 proceeds to step S11 in cases in which a determination of YES is made at step S10. On proceeding to step S11, the support state determination section 226 of the ECU 22 determines the driving support state of the vehicle 12 based on the type of image data displayed on the display 48 and the position of the shift lever.

The ECU 22 proceeds to step S12 in cases in which a determination of NO is made at step S10. On proceeding to step S12, the recording condition change section 224 of the ECU 22 sets the aforementioned threshold value to the threshold value In.

On completion of the processing of step S11, the ECU 22 proceeds to step S13. On proceeding to step S13, the recording condition change section 224 of the ECU 22 determines whether or not it is necessary to change the threshold value. Namely, the recording condition change section 224 determines whether or not the driving support state determined at step S11 during the previous round of processing according to the flowchart is different than the driving support state determined at step S11 during the current round of processing based on the flowchart. In cases in which the driving support state during the previous round of processing and the driving support state during the current round of processing are different than each other, the recording condition change section 224 makes a determination of YES. Note that in cases in which the vehicle 12 is not in any driving support state during one out of the previous round of processing or the current round of processing and the vehicle 12 is in a driving support state during the other out of the previous round of processing or the current round of processing, the recording condition change section 224 makes a determination of YES.

The recording condition change section 224 proceeds to step S14 in cases in which a determination of YES is made at step S13. At step S14, the recording condition change section 224 refers to the one-dimensional map 57 to change the threshold value.

In cases in which the ECU 22 has completed the processing of step S12 or step S14 or in cases in which a determination of NO is made at step S13, the ECU 22 proceeds to step S15. On proceeding to step S55, the condition-satisfaction determination section 225 of the ECU 22 determines whether or not the acceleration of the vehicle 12 is greater than the threshold value, based on the threshold value and the acceleration information transmitted from the acceleration sensor 54.

The ECU 22 proceeds to step S16 in cases in which a determination of YES is made at step S15, and the recording control section 223 causes the image data displayed on the display 48 for the aforementioned recording time band to be recorded in the ROM 22B.

On completion of step S16 or in cases in which a determination of NO is made at step S15, the ECU 22 ends this round of processing based on the flowchart.

Operation and Advantageous Effects

Next, explanation follows regarding operation and advantageous effects of the present exemplary embodiment.

In cases in which the vehicle 12 has been determined to be in one out of the plural driving support states, the ECU 22 of the driving support system 10 causes image data corresponding to the driving support state to be displayed on the display 48. Moreover, when the acceleration of the vehicle 12 is greater than the corresponding threshold value, the recording control section 223 of the ECU 22 causes the image data displayed on the display 48 for the recording time band to be recorded in the ROM 22B.

Moreover, the recording condition change section 224 of the ECU 22 changes the threshold value to the first threshold value, the second threshold value, the third threshold value, or the fourth threshold value corresponding to the respective driving support state in accordance with the type of driving support state of the vehicle 12. The first threshold value, the second threshold value, the third threshold value, and the fourth threshold value are each set in consideration of predetermined events that may befall the vehicle 12 when in the respective driving support states.

For example, in cases in which the vehicle 12 is in the parking-exit support state, the recording condition change section 224 changes the threshold value to the first threshold value. The first threshold value is set to a level that the output value of the acceleration sensor 54 will not exceed when the wheels of the vehicle 12 ride over small bumps or dips on the road surface. Accordingly, there is little chance that the acceleration of the vehicle 12 which is detected by the acceleration sensor 54 exceeds the first threshold value when the front wheels 14 or the rear wheels 16 of the vehicle 12 ride over small bumps or dips on the road surface while in the parking-exit support state. There is therefore little chance that the image data (the wide front image data Imfw and wide back image data Imbw) will be recorded in the ROM 22B when the front wheels 14 or the rear wheels 16 of the vehicle 12 ride over small bumps or dips on the road surface while in the parking-exit support state. Accordingly, there is little chance of image data that does not need to be recorded being recorded in the ROM 22B while the vehicle 12 is in the parking-exit support state.

On the other hand, the first threshold value is also set to a level that the output value of the acceleration sensor 54 will exceed if the vehicle 12 collides with another vehicle while exiting from the parking space 70. There is therefore a high likelihood that the acceleration as detected by the acceleration sensor 54 will exceed the first threshold value if the vehicle 12 collides with another vehicle while exiting from the parking space 70. There is therefore a high likelihood that the image data generated by the image processing section 222 (the wide front image data Imfw and wide back image data Imbw) will be recorded in the ROM 22B in such cases. Accordingly, there is little chance of image data that needs to be recorded not being recorded in the ROM 22B while the vehicle 12 is in the parking-exit support state.

In cases in which the vehicle 12 is in the side monitoring support state, the recording condition change section 224 changes the threshold value to the second threshold value that is larger than the first threshold value. The second threshold value is set to a level that the output value of the acceleration sensor 54 will exceed if the front wheels 14 or the rear wheels 16 of the vehicle 12 contact the curb 73 of the road 72 in an oblique direction. The second threshold value is also set to a level that the output value of the acceleration sensor 54 will exceed if the vehicle 12 that is exiting from the parking space 70 positioned between the two other stationary vehicles 76, 78 (namely, the vehicle 12 that is passing out from between the two other vehicles 76, 78) contacts either of the other vehicles 76, 78. The second threshold value is also set to a level that the output value of the acceleration sensor 54 will exceed if the vehicle 12 that is exiting the parking space 70 positioned between the two other stationary vehicles 76, 78 while turning toward the left side or the right side in the direction of arrow B1 or arrow B2 in FIG. 10 contacts either of the other vehicles 76, 78 (namely, contacts either of the other vehicles 76, 78 while turning). Accordingly, there is a high likelihood that the acceleration detected by the acceleration sensor 54 will exceed the second threshold value if the front wheels 14 or the rear wheels 16 of the vehicle 12 contact the curb 73 in an oblique direction when in the side monitoring support state. Moreover, there is a high likelihood that the acceleration detected by the acceleration sensor 54 will exceed the second threshold value in cases in which the vehicle 12 that is passing out from between the other vehicles 76, 78 contacts either of the other vehicles 76, 78. There is also a high likelihood that the acceleration detected by the acceleration sensor 54 will exceed the second threshold value in cases in which the vehicle 12 that is exiting the parking space 70 positioned between the other vehicles 76, 78 while turning toward the left side or the right side contacts either of the other vehicles 76, 78. There is therefore a high likelihood that the image data generated by the image processing section 222 (the left side image data Imls and the right side image data Imrs) will be recorded in the ROM 22B if one of the aforementioned events occurs. Accordingly, there is little chance of image data that needs to be recorded not being recorded in the ROM 22B while the vehicle 12 is in the side monitoring support state.

In cases in which the vehicle 12 is in the parking support state, the recording condition change section 224 changes the threshold value to the third threshold value that is greater than the second threshold value. The third threshold value is set to a level that the output value of the acceleration sensor 54 will not exceed if the front wheels 14 or the rear wheels 16 of the vehicle 12 contact the wheel stoppers 71 provided in the parking space 70. Accordingly, there is a low likelihood of the acceleration detected by the acceleration sensor 54 exceeding the third threshold value if the front wheels 14 or the rear wheels 16 of the vehicle 12 contact the wheel stoppers 71 while in the parking support state. Accordingly, there is a low likelihood that the image data generated by the image processing section 222 (the narrow front image data Imfn and narrow back image data Imbn) will be recorded in the ROM 22B in such cases. Accordingly, there is little chance of image data that does not need to be recorded being recorded in the ROM 22B while the vehicle 12 is in the parking support state.

On the other hand, the third threshold value is also set to a level that the output value of the acceleration sensor 54 will exceed if the vehicle body of the vehicle 12 contacts an obstacle (for example a pole) in the parking space 70. Accordingly, there is a high likelihood that the output value of the acceleration sensor 54 will exceed the third threshold value if the vehicle body of the vehicle 12 contacts a pole installed in the parking space 70 in cases in which the driving support state is the parking support state. There is therefore a high likelihood that the image data generated by the image processing section 222 (the narrow front image data Imfn and narrow back image data Imbn) that needs to be recorded will be recorded in the ROM 22B. Accordingly, there is little chance of image data that needs to be recorded not being recorded in the ROM 22B while the vehicle 12 is in the parking support state.

In cases in which the vehicle 12 is in the off-road travel support state, the recording condition change section 224 changes the threshold value to the fourth threshold value that is greater than the third threshold value. The fourth threshold value is set to a level that the output value of the acceleration sensor 54 will not exceed if the front wheels 14 or the rear wheels 16 of the vehicle 12 ride over a rock 83 on the off-road terrain 82. There is therefore a low likelihood of the output value of the acceleration sensor 54 exceeding the fourth threshold value if the front wheels 14 or the rear wheels 16 of the vehicle 12 ride over a rock 83 in cases in which the driving support state is the off-road travel support state. Accordingly, in such cases there is little chance of image data generated by the image processing section 222 that does not need to be recorded being recorded in the ROM 22B.

On the other hand, the fourth threshold value is also set to a level that the output value of the acceleration sensor 54 will exceed if the vehicle 12 traveling on the off-road terrain 82 contacts another vehicle. Accordingly, there is a high likelihood that the output value of the acceleration sensor 54 will exceed the fourth threshold value if the vehicle 12 traveling on the off-road terrain 82 contacts another vehicle in cases in which the driving support state is the off-road travel support state. There is therefore a high likelihood that the image data generated by the image processing section 222 will be recorded in the ROM 22B in such cases. Accordingly, there is little chance of image data generated by the image processing section 222 that needs to be recorded not being recorded in the ROM 22B while the vehicle 12 is in the off-road travel support state.

In the driving support system 10 that employs the specific recording condition to determine whether or not the recording condition has been satisfied in this manner, there is little chance of image data that does not need to be recorded in the ROM 22B being recorded in the ROM 22B, and also little chance of image data that needs to be recorded in the ROM 22B not being recorded in the ROM 22B, regardless of the driving support state of the vehicle 12.

The support state determination section 226 determines whether or not the vehicle 12 is in any of the driving support states based on the type of image data displayed on the display 48 and the shift position of the shift lever. The support state determination section 226 is thereby capable of determining whether or not the vehicle 12 is in any of the driving support states with a high level of precision.

Second Exemplary Embodiment

Figure 21:
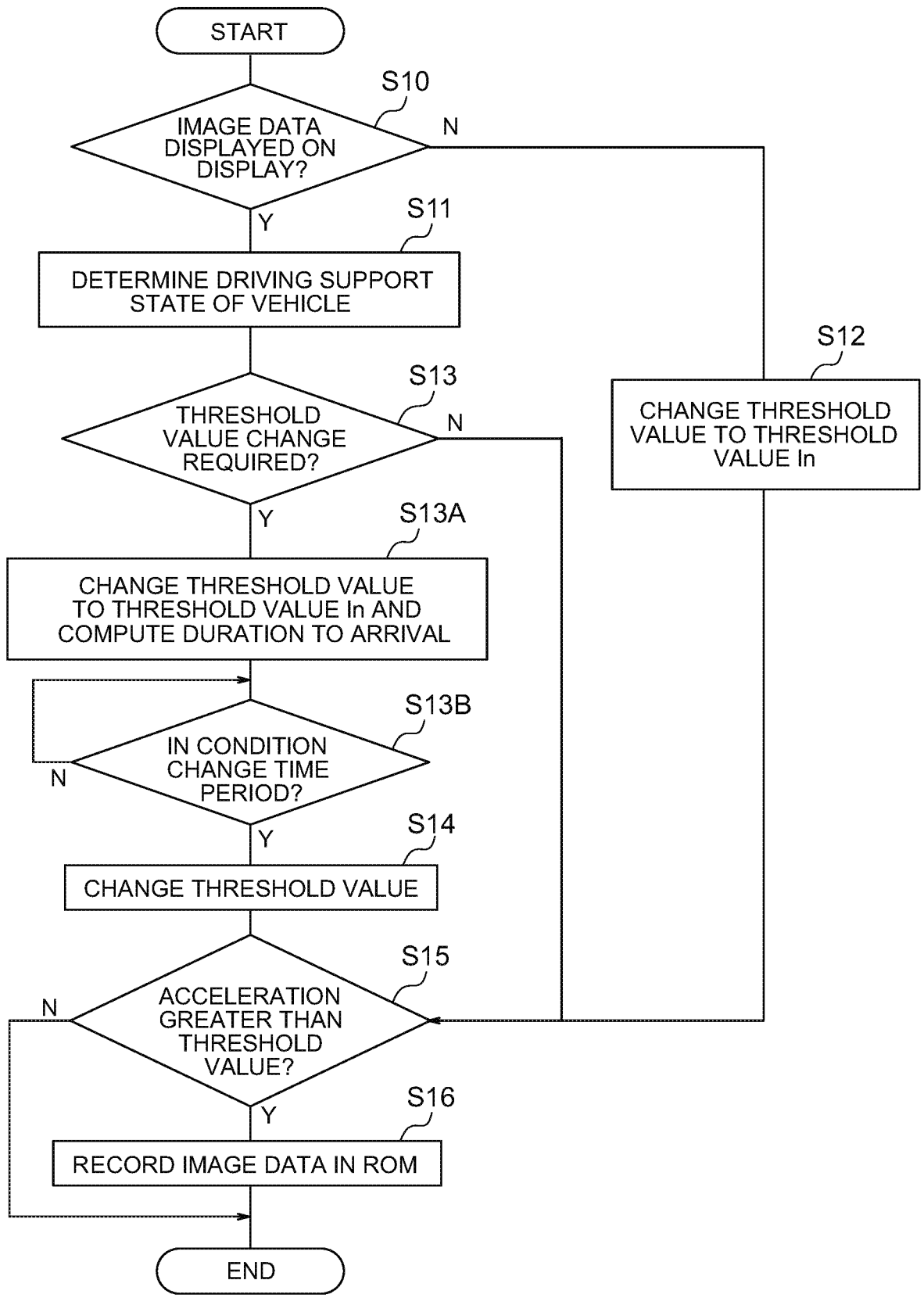
FIG. 21 is a flowchart illustrating processing performed by an ECU of the vehicle provided with a driving support system according to a second exemplary embodiment.

Next, explanation follows regarding a second exemplary embodiment of a driving support system 10, a driving support method, and a non-transitory recording medium according to the present disclosure, with reference to FIG. 21. Note that configurations similar to those of the first exemplary embodiment are allocated the same reference numerals, and explanation thereof is omitted where appropriate.

The ECU 22 of the driving support system 10 of the second exemplary embodiment executes the processing in the flowchart of FIG. 21 at predetermined time intervals in cases in which the ignition switch is positioned at the ON position and the selection switch 24 is at any out of the H4 position, the H2 position, or the LA position. The flowchart in FIG. 21 differs from the flowchart in FIG. 20 only in the inclusion of steps S13A and S13B.

The recording condition change section 224 proceeds to step S13A following a determination of YES at step S13. At step S13A, the recording condition change section 224 sets the threshold value to the threshold value In. The recording condition change section 224 then computes a distance between an obstacle depicted on the display 48 and a part of the vehicle 12 that could potentially collide with the obstacle based on the image data. For example, a case is envisaged in which the vehicle 12 is in the parking support state and is entering the parking space 70 from the front end section in order to park in the parking space 70, as illustrated in FIG. 6. If the driver D operates the camera switch 50 in such a case, the narrow front image data Imfn generated by the image processing section 222 is displayed on the display 48, as illustrated in FIG. 7. When this is performed, the recording condition change section 224 computes the distance between the front wheels 14 of the vehicle 12 and the wheel stoppers 71 that are obstacles, based on the narrow front image data Imfn. Note that the vehicle 12 may be provided with a radar sensor that emits a radar beam (for example a millimeter-wave radar or a laser radar) toward the wheel stoppers 71 and receives a reflected beam that has been reflected by the wheel stoppers 71. In such cases, the recording condition change section 224 of the ECU 22, this being electrically connected to the radar sensor, computes the distance between the front wheels 14 and the wheel stoppers 71 using information regarding the reflected beam received from the radar sensor.

The vehicle 12 of the present exemplary embodiment is provided with four wheel speed sensors (not illustrated in the drawings) to detect the wheel speeds of the respective front wheels 14 and the respective rear wheels 16. The wheel speed sensors are electrically connected to the ECU 22. Each of the wheel speed sensors outputs a signal corresponding to a rotation speed (wheel speed) of the corresponding front wheel 14 or rear wheel 16 at predetermined time intervals. The ECU 22 computes the vehicle speed of the vehicle 12 as an average value of the rotation speeds of the front wheels 14 and the rear wheels 16 based on the signals received from the respective wheel speed sensors at predetermined time intervals. At step S13A, the recording condition change section 224 computes a duration to arrival, this being the time until the front wheels 14 arrive at the wheel stoppers 71, based on the distance between the front wheels 14 and the wheel stoppers 71 and the vehicle speed.

On completion of the processing of step S13A, the recording condition change section 224 proceeds to step S13B. At step S13B, the recording condition change section 224 computes an expected time, this being a time at which the front wheels 14 are expected to reach the wheel stoppers 71 based on the duration to arrival and the current time. The recording condition change section 224 also computes a predetermined time band (referred to hereafter as a condition change time period) that includes the expected time. At step S13B, the recording condition change section 224 then determines whether or not the current time is a start time of the condition change time period. The recording condition change section 224 proceeds to step S14 when a determination of YES is made. On the other hand, the recording condition change section 224 repeats the processing of step S13B when a determination of NO is made.

On proceeding to step S14, the recording condition change section 224 changes the threshold value to the threshold value corresponding to the current driving support state for the duration of the condition change time period.

Operation and Advantageous Effects

Next, explanation follows regarding operation and advantageous effects of the second exemplary embodiment.

In cases in which the support state determination section 226 of the driving support system 10 of the second exemplary embodiment determines the vehicle 12 to be in any driving support state, the recording condition change section 224 changes the threshold value to the first threshold value, the second threshold value, the third threshold value, or the fourth threshold value only for the condition change time period.

The first threshold value, the second threshold value, the third threshold value, and the fourth threshold value are set in consideration of predetermined events that may befall the vehicle 12 while the vehicle 12 is in the respective driving support states. However, it is not necessarily the case that such events occur while the vehicle 12 is in a driving support state. For example, in a case in which the vehicle 12 is in the parking support state for the duration of a predetermined time band when parking in the parking space 70, an event of the front wheels 14 colliding with the wheel stoppers 71 can only occur in a target time band, this being a time band corresponding to part of the predetermined time band. In other words, there is a low likelihood of an event of the front wheels 14 colliding with the wheel stoppers 71 in a non-target time band, this being a time band corresponding to the remainder of the predetermined time band. Accordingly, were the threshold value to be set to the third threshold value for the duration of the predetermined time band, there is a chance that the output value of the acceleration sensor 54 does not exceed the third threshold value when the vehicle 12 traveling at a crawl contacts another vehicle during the non-target time band. Namely, there is a chance that image data generated by the image processing section 222 that needs to be recorded may not be recorded in the ROM 22B.

By contrast, in the driving support system 10 of the second exemplary embodiment, the threshold value is changed to the first threshold value, the second threshold value, the third threshold value, or the fourth threshold value only during the condition change time period, this corresponding to the target time band. In other words, the threshold value is set to the threshold value In for the non-target time band. Accordingly, if the vehicle 12 contacts another vehicle while traveling at a crawl during the non-target time band, there is a high likelihood that the output value of the acceleration sensor 54 will exceed the threshold value In, and a high likelihood that the image data generated by the image processing section 222 at this time that needs to be recorded will be recorded in the ROM 22B. On the other hand, there is a high likelihood that the output value of the acceleration sensor 54 will not exceed the third threshold value if the front wheels 14 collide with the wheel stoppers 71 during the condition change time period. Namely, in such cases, there is little chance of image data that does not need to be recorded being recorded in the ROM 22B.

Third Exemplary Embodiment

Next, explanation follows regarding a third exemplary embodiment of a driving support system 10, a driving support method, and a non-transitory recording medium according to the present disclosure, with reference to FIG. 22. Note that configurations similar to those of the first exemplary embodiment are allocated the same reference numerals, and explanation thereof is omitted where appropriate.

The ECU 22 of the driving support system 10 of the third exemplary embodiment repeatedly executes the processing in the flowchart of FIG. 22 at predetermined time intervals in cases in which the ignition switch is positioned at the ON position and the selection switch 24 is positioned at any out of the H4 position, the H2 position, or the L4 position. The flowchart in FIG. 22 differs from the flowchart in FIG. 20 only in the inclusion of steps S12A and S12B.

The ECU 22 proceeds to step S12A following a determination of NO at step S10. At step S12A, the recording condition change section 224 of the ECU 22 determines whether or not a predetermined prolongment duration has elapsed since a switchover time, this being the time at which the display 48 was switched from a display state to a non-display state. Note that in cases in which the display 48 has been in the non-display state continuously since the position of the ignition switch was switched to the ON position up to the current time, the recording condition change section 224 makes a determination of YES at step S12A.

Following a determination of YES at step S12A, the recording condition change section 224 proceeds to step S12B, and sets the threshold value to the threshold value In.

On the other hand, following a determination of NO at step S12A, the recording condition change section 224 proceeds to step S14 and changes the threshold value. In such cases, the recording condition change section 224 changes the threshold value to the threshold value corresponding to the driving support state of the vehicle 12 immediately prior to the switchover time. For example, in cases in which the driving support state immediately prior to the switchover time was the off-road travel support state, the recording condition change section 224 sets the threshold value to the fourth threshold value at step S14.

Operation and Advantageous Effects

Next, explanation follows regarding operation and advantageous effects of the third exemplary embodiment.

In cases in which the prolongment duration has not yet elapsed since the switchover time at which the display 48 was switched from the display state to the non-display state, the recording condition change section 224 of the driving support system 10 of the third exemplary embodiment changes the threshold value to the threshold value corresponding to the driving support state of the vehicle 12 immediately prior to the switchover time.

For example, a case is envisaged in which the vehicle 12 is in the off-road travel support state when traveling along the off-road terrain 82, and the vehicle 12 has reached a pending-boundary position immediately ahead of a boundary position between the off-road terrain 82 and a paved road. When the vehicle 12 reaches this pending-boundary position with the display 48 in the display state, the driver D may operate the camera switch 50 to switch the display 48 to the non-display state. However, a remaining region that is a region between the pending-boundary position and the boundary position is part of the off-road terrain 82. Accordingly, in such cases, even though the driver D has demonstrated their intention to end the off-road travel support state, there is still a possibility that the front wheels 14 or the rear wheels 16 of the vehicle 12 might ride over a rock 83 on the off-road terrain 82 while the vehicle 12 is still traveling in the remaining region. Accordingly, even though the driver D has switched the display 48 to the non-display state, it is preferable to set (maintain) the threshold value at the fourth threshold value while the vehicle 12 is still traveling in the remaining region. Note that the prolongment duration is preferably set to a duration of sufficient length for the vehicle 12 traveling along the off-road terrain 82 at a predetermined speed to cross over the remaining region and reach the road.

The driving support system 10 of the third exemplary embodiment sets (maintains) the threshold value at the fourth threshold value if the prolongment duration has not yet elapsed since the switchover time at which the display 48 was switched from the display state to the non-display state. Accordingly, there is a high likelihood that the output value of the acceleration sensor 54 will not exceed the fourth threshold value if the vehicle 12 rides over the rock 83 in the remaining region. Namely, there is little chance of image data that does not need to be recorded being recorded in the ROM 22B.

Although explanation has been given regarding the driving support system 10, the driving support method, and the non-transitory recording medium according to the above exemplary embodiments, appropriate design modifications to the driving support system 10, the driving support method, and the non-transitory recording medium are possible within a range not departing from the spirit of the present disclosure.

There is no limitation to the types of image data generated based on the electrical signals from the respective cameras. For example, it is sufficient that the image processing section 222 generate at least two out of the narrow front image data Imfn, the narrow back image data Imbn, the left side image data Imls, the right side image data Imrs, the wide front image data Imfw, the wide back image data Imbw, or the panoramic view image data. Alternatively, the image processing section 222 may generate a different type of image data than the narrow front image data Imfn, the narrow back image data Imbn, the left side image data Imls, the right side image data Imrs, the wide front image data Imfw, the wide back image data Imbw, or the panoramic view image data, and display such image data on the display 48.

Configuration may be made so as to record image data generated based on the electrical signals from the respective cameras in the storage 22D (memory) of the ECU 22 in cases in which the acceleration detected by the acceleration sensor 54 exceeds the threshold value.

The ECU 22 may utilize information from a navigation system installed in the vehicle 12 in order to set the driving support state of the vehicle 12 automatically. For example, the ECU 22 may set the driving support state to the parking support state when the vehicle 12 is determined to have traveled home from a location away from the home which is registered in the navigation system, based on information from the navigation system. Alternatively, the ECU 22 may set the driving support state to the parking support state when the vehicle 12 has been determined to have traveled to a shop having a parking space as registered in the navigation system, based on information from the navigation system. In such cases, the narrow front image data Imfn or the narrow back image data Imbn is displayed on the display 48 even in cases in which the driver D does not operate the camera switch 50. Moreover, in such cases it may be considered highly likely that the vehicle 12 will park in the parking space at the home or the shop. Accordingly, there is a high likelihood that the driver D of the vehicle 12 may receive parking support by looking at the image data displayed on the display 48 even when the camera switch 50 is not operated.

In cases in which the vehicle 12 is capable of being set to travel in a predetermined travel mode by operating a switch (not illustrated in the drawings) provided in the vehicle 12, the recording condition change section 224 may change the threshold value to a value corresponding to the respective travel modes. For example, in cases in which the vehicle 12 is traveling in a snow mode, the recording condition change section 224 may change the threshold value to a value corresponding to the snow mode. Alternatively, in cases in which the vehicle 12 is traveling in a dirt mode, the recording condition change section 224 may change the threshold value to a value corresponding to the dirt mode.

Configuration may be made such that the recording control section 223 of the ECU 22 does not cause the image data generated during the recording time band described above to be recorded in the ROM 22B or in the storage 22D when the selection switch 24 is positioned at the H4 position or the L4 position.

The support state determination section 226 may determine the type of driving support state based on the type of image data displayed on the display 48, the shift position of the shift lever, and the vehicle speed. For example, in cases in which the vehicle 12 is in the 2WD driving state or the 4WD driving state, the shift lever is in the D range, the narrow front image data Imfn is displayed on the display 48, and the vehicle speed is a predetermined speed or lower, the support state determination section 226 may determine the driving support state of the vehicle 12 to be the parking support state. On the other hand, even in cases in which the vehicle 12 is in the 2WD driving state or the 4WD driving state, the shift lever is in the D range, and the narrow front image data Imfn is displayed on the display 48, there is a high likelihood that the vehicle 12 is traveling along a road at high speed if the vehicle speed is greater than the predetermined speed. In such cases, the threshold value is set to the threshold value In.

Configuration may be made such that the support state determination section 226 may determine the type of driving support state of the vehicle 12 based only on the type of image data displayed on the display 48.

There is no limitation to the number of types of driving support states capable of being executed by the vehicle 12 and the number of types of corresponding threshold values, as long as there are plural types thereof.

A sensor for detecting a physical quantity arising in the vehicle 12 as a result of a collision with an obstacle may be configured by a sensor other than the acceleration sensor 54. For example, such a sensor for detecting a physical quantity may be configured by a load sensor. In cases in which a load sensor is employed, the respective threshold values are threshold values that relate to load.

The recording control section 223 of the ECU 22 may be configured to cause all image data generated by the image processing section 222 at a time when a sensor detects a physical quantity exceeding the corresponding threshold value to be recorded in memory.

The vehicle 12 may be a manual transmission (MT) vehicle.

Alternatively, the vehicle 12 may be a two-wheel drive vehicle in which only the front wheels or the back wheels configure drive wheels.

What is claimed is:

1. A driving support system, comprising:
a memory;
a plurality of cameras installed at a vehicle configured to selectively execute a driving support state from among a plurality of driving support states configured to support respective driving operations by a driver, the plurality of cameras being configured to image an imaging subject positioned at a periphery of the vehicle; and
a processor coupled to the memory and to the plurality of cameras, the processor being configured to:
generate image data by performing image processing on an electrical signal transmitted from the plurality of cameras;
determine whether or not a recording condition has been satisfied;
cause the image data to be recorded in the memory in cases in which the recording condition has been determined to have been satisfied;
determine whether or not the vehicle is in any of the plurality of driving support states, the plurality of driving support states comprising at least one of a parking-exit support state, a side monitoring support state, a parking support state, and an off-road travel support state; and
change the recording condition to a specific recording condition of a plurality of recording conditions, the specific recording condition corresponding to the driving support state of the vehicle in cases in which the vehicle has been determined to be in any of the plurality of driving support states,
wherein the processor is further configured to:
determine the recording condition to have been satisfied in cases in which an output value of a sensor exceeds a distinct threshold value relating to a size of a physical quantity; and
change the distinct threshold value to a first threshold value in cases in which the driving support state is the parking-exit support state configured to support a first driving operation to cause the vehicle to exit from a first parking space.

2. The driving support system of claim 1, further comprising a display configured to display the image data, wherein:
the processor is configured to determine whether or not the vehicle is in any of the plurality of driving support states based on at least a type of the image data displayed on the display.

3. The driving support system of claim 1, further comprising the sensor configured to measure the size of the physical quantity arising in the vehicle as a result of a collision with an obstacle, wherein:
the processor changes the distinct threshold value to a second threshold value larger than the first threshold value in cases in which the driving support state is the side monitoring support state configured to support monitoring at a side of the vehicle by the driver.

4. The driving support system of claim 3, wherein the processor changes the distinct threshold value to a third threshold value larger than the second threshold value in cases in which the driving support state is the parking support state configured to support a second driving operation to cause the vehicle to park in a second parking space.

5. The driving support system of claim 4, wherein the processor changes the distinct threshold value to a fourth threshold value larger than the third threshold value in cases in which the driving support state is the off-road travel support state configured to support a third driving operation to cause the vehicle to travel along an off-road terrain.

6. The driving support system of claim 1, wherein the processor changes the recording condition to the specific recording condition only for a predetermined condition-change time period in cases in which the processor has determined the vehicle to be in any of the plurality of driving support states.

7. The driving support system of claim 1, wherein the processor is further configured to determine whether or not the vehicle is in any of the plurality of driving support states based on at least a type of the image data displayed on a display, a shift position of a shift lever, and a vehicle speed.

8. The driving support system of claim 1, wherein each recording condition of the plurality of recording conditions has a different threshold value relating to the size of the physical quantity.

9. A driving support method executed by a processor, the processor being configured to:
image an imaging subject positioned at a periphery of a vehicle configured to selectively execute a driving support state from among a plurality of driving support states configured to support respective driving operations by a driver, and generate image data;
determine whether or not a recording condition has been satisfied;
record the image data in a memory in cases in which the recording condition has been determined to have been satisfied;
determine whether or not the vehicle is in any of the plurality of driving support states, the plurality of driving support states comprising at least one of a parking-exit support state, a side monitoring support state, a parking support state, and an off-road travel support state; and
change the recording condition to a specific recording condition of a plurality of recording conditions, the specific recording condition corresponding to the driving support state of the vehicle in cases in which the vehicle has been determined to be in any of the plurality of driving support states,
wherein the processor is further configured to:
determine the recording condition to have been satisfied in cases in which an output value of a sensor that measures a size of a physical quantity arising in the vehicle as a result of a collision with an obstacle exceeds a distinct threshold value relating to the size of the physical quantity; and
change the distinct threshold value to a first threshold value in cases in which the driving support state is the parking-exit support state configured to support a first driving operation to cause the vehicle to exit from a first parking space.

10. The driving support method of claim 9, wherein the processor is configured to determine whether or not the vehicle is in any of the plurality of driving support states based on at least a type of the image data displayed on a display.

11. The driving support method of claim 9, wherein the processor:
changes the distinct threshold value to a second threshold value larger than the first threshold value in cases in which the driving support state is the side monitoring support state configured to support monitoring at a side of the vehicle by the driver.

12. The driving support method of claim 11, wherein the processor changes the distinct threshold value to a third threshold value larger than the second threshold value in cases in which the driving support state is the parking support state configured to support a second driving operation to cause the vehicle to park in a second parking space.

13. The driving support method of claim 12, wherein the processor changes the distinct threshold value to a fourth threshold value larger than the third threshold value in cases in which the driving support state is the off-road travel support state configured to support a third driving operation to cause the vehicle to travel along an off-road terrain.

14. The driving support method of claim 9, wherein the processor changes the recording condition to the specific recording condition only for a predetermined condition-change time period in cases in which the vehicle has been determined to be in any of the plurality of driving support states.

15. The driving support method of claim 9, wherein the processor is further configured to determine whether or not the vehicle is in any of the plurality of driving support states based on at least a type of the image data displayed on a display, a shift position of a shift lever, and a vehicle speed.

16. The driving support method of claim 9, wherein each recording condition of the plurality of recording conditions has a different threshold value relating to the size of the physical quantity.

17. A non-transitory recording medium storing a program that is executable by a computer to perform processing, the processing comprising:
   imaging an imaging subject positioned at a periphery of a vehicle configured to selectively execute a driving support state from among a plurality of driving support states configured to support respective driving operations by a driver, the vehicle being further configured to generate image data;
   determining whether or not a recording condition has been satisfied;
   recording the image data in a memory in cases in which the recording condition has been determined to have been satisfied;
   determining whether or not the vehicle is in any of the plurality of driving support states, the plurality of driving support states comprising at least one of a parking-exit support state, a side monitoring support state, a parking support state, and an off-road travel support state; and
   changing the recording condition to a specific recording condition of a plurality of recording conditions, the specific recording condition corresponding to the driving support state of the vehicle in cases in which the vehicle has been determined to be in any of the plurality of driving support states,
   wherein the processing further comprises:
      determining the recording condition to have been satisfied in cases in which an output value of a sensor that measures a size of a physical quantity arising in the vehicle as a result of a collision with an obstacle exceeds a distinct threshold value relating to the size of the physical quantity; and
   changing the distinct threshold value to a first threshold value in cases in which the driving support state is the parking-exit support state configured to support a first driving operation to cause the vehicle to exit from a first parking space.

18. The non-transitory recording medium of claim 17, wherein the processing further comprises determining whether or not the vehicle is in any of the plurality of driving support states based on at least a type of the image data displayed on a display.

19. The non-transitory recording medium of claim 17, wherein the processing further comprises:
   changing the distinct threshold value to a second threshold value larger than the first threshold value in cases in which the driving support state is the side monitoring support state configured to support monitoring at a side of the vehicle by the driver.

20. The non-transitory recording medium of claim 19, wherein the processing further comprises changing the distinct threshold value to a third threshold value larger than the second threshold value in cases in which the driving support state is the parking support state configured to support a second driving operation to cause the vehicle to park in a second parking space.

21. The non-transitory recording medium of claim 20, wherein the processing further comprises changing the distinct threshold value to a fourth threshold value larger than the third threshold value in cases in which the driving support state is the off-road travel support state configured to support a third driving operation to cause the vehicle to travel along an off-road terrain.

22. The non-transitory recording medium of claim 17, wherein the processing further comprises changing the recording condition to the specific recording condition only for a predetermined condition change time period in cases in which the vehicle has been determined to be in any of the plurality of driving support states.

23. The non-transitory recording medium of claim 17, wherein the processing further comprises determining whether or not the vehicle is in any of the plurality of driving support states based on at least a type of the image data displayed on a display, a shift position of a shift lever, and a vehicle speed.

24. The non-transitory recording medium of claim 17, wherein each recording condition of the plurality of recording conditions having a different threshold value relating to the size of the physical quantity.

* * * * *